United States Patent
Li et al.

(10) Patent No.: US 11,533,254 B2
(45) Date of Patent: Dec. 20, 2022

(54) PACKET PROCESSING METHOD, RELATED DEVICE, AND COMPUTER STORAGE MEDIUM

(71) Applicant: Huawei Technologies Co., Ltd., Shenzhen (CN)

(72) Inventors: Cheng Li, Beijing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/240,040

(22) Filed: Apr. 26, 2021

(65) Prior Publication Data
US 2021/0250281 A1   Aug. 12, 2021

Related U.S. Application Data

(63) Continuation of application No. PCT/CN2019/110932, filed on Oct. 14, 2019.

(30) Foreign Application Priority Data

Oct. 27, 2018   (CN) .......................... 201811262866.4

(51) Int. Cl.
*H04L 12/717*   (2013.01)
*H04L 12/721*   (2013.01)
(Continued)

(52) U.S. Cl.
CPC .............. *H04L 45/42* (2013.01); *H04L 45/02* (2013.01); *H04L 45/123* (2013.01); *H04L 45/302* (2013.01); *H04L 45/741* (2013.01)

(58) Field of Classification Search
CPC ....... H04L 45/42; H04L 45/02; H04L 45/123; H04L 45/302; H04L 45/741
See application file for complete search history.

(56) References Cited

U.S. PATENT DOCUMENTS 10,681,114 B2   6/2020 Kitazato et al.
2006/0018318 A1*   1/2006 Rinne ................... H04L 69/166
370/389

(Continued)

FOREIGN PATENT DOCUMENTS

CN   105282028 A   1/2016
CN   105450437 A   3/2016
(Continued)

OTHER PUBLICATIONS

Filsfils, C. et al., "SRv6 Network Programming draft-filsfils-spring-srv6-network-programming-06," Spring Internet-Draft, Intended Status: Standards Track, Expires: Apr. 25, 2019, Huawei Technologies, Oct. 22, 2018, 55 pages.

(Continued)

*Primary Examiner* — Christopher B Robinson
(74) *Attorney, Agent, or Firm* — Slater Matsil, LLP

(57) ABSTRACT

A system and network devices for packet processing, a network device including a processor and instructions for receiving a first packet sent by a second network node, the first packet including a format of a segment identifier of the second network node describing a length and a location of each field in the segment identifier, obtaining the format based on the first packet, the segment identifier having a first field, and including a determined value of the first field in the segment identifier in a second packet sent to the second network node, the value of the first field in the segment identifier being determined based on a segment routing policy and the format, and the determined value of the first field indicating to the second network node to process the second packet.

20 Claims, 15 Drawing Sheets

(51) Int. Cl.
*H04L 12/725* (2013.01)
*H04L 12/749* (2013.01)
*H04L 12/751* (2013.01)
*H04L 45/42* (2022.01)
*H04L 45/02* (2022.01)
*H04L 45/12* (2022.01)
*H04L 45/302* (2022.01)
*H04L 45/741* (2022.01)

(56) References Cited

U.S. PATENT DOCUMENTS

| | | | |
|---|---|---|---|
| 2007/0195797 A1* | 8/2007 | Patel | H04L 47/10 370/469 |
| 2011/0200045 A1* | 8/2011 | Baehre | H04L 12/4633 370/392 |
| 2012/0300781 A1* | 11/2012 | Sarela | H04L 45/10 370/392 |
| 2016/0142321 A1* | 5/2016 | Gage | H04W 76/10 370/235 |
| 2017/0005920 A1 | 1/2017 | Previdi et al. | |
| 2017/0324654 A1 | 11/2017 | Previdi et al. | |
| 2017/0324674 A1* | 11/2017 | Bergquist | H04L 47/30 |
| 2017/0373966 A1 | 12/2017 | Liao et al. | |
| 2018/0132224 A1 | 5/2018 | Cheng et al. | |
| 2019/0021047 A1 | 1/2019 | Zong | |
| 2019/0042276 A1 | 2/2019 | Zhu | |
| 2020/0153733 A1 | 5/2020 | Chunduri et al. | |

FOREIGN PATENT DOCUMENTS

| | | |
|---|---|---|
| CN | 105991437 A | 10/2016 |
| CN | 106375987 A | 2/2017 |
| CN | 106664456 A | 5/2017 |
| CN | 107181689 A | 9/2017 |
| CN | 107277086 A | 10/2017 |
| CN | 108702328 A | 10/2018 |

OTHER PUBLICATIONS

Previdi, S. et al., "Distribution of Traffic Engineering (TE) Policies and State Using BGP-LS draft-ietf-idr-te-lsp-distribution-09," Network Working Group, Internet Draft, Intended Status: Standards Track, Expires: Dec. 31, 2018, Jun. 29, 2018, 47 pages.

Previdi, S. et al., "IPv6 Segment Routing Header (SRH) draft-ietf-6man-segment-routing-header-15," Network Working Group, Internet-Draft, Intended Status: Standards Track, Expires: Apr. 25, 2019, C. Filsfils, Ed. Cisco Systems, Inc., Oct. 22, 2018, 28 pages.

* cited by examiner

| Next header | Hdr Ext Len | Routing type | Segmens left |
|---|---|---|---|
| Last entry | Flags | Tag | |
| Segment list[0] | | | |
| ... | | | |
| Segment list[n] | | | |
| Optional type length value objects | | | |

FIG. 1

| 0 | 55 | 63 | 127 |
|---|---|---|---|
| Locator | | Flag | Function |

FIG. 2

| Type = locator | Length | Offset | Length |
|---|---|---|---|
| Variable locator | | | |

FIG. 3A

| Type = flag | Length | Offset | Length |
|---|---|---|---|
| Optional sub-TLVs | | | |

FIG. 3B

| Type | Length | Value |
|---|---|---|

FIG. 3C

| Type = function | Length | Offset | Length |
|---|---|---|---|
| | Optional sub-TLVs | | |

FIG. 3D

PACKET PROCESSING METHOD, RELATED DEVICE, AND COMPUTER STORAGE MEDIUM

CROSS-REFERENCE TO RELATED APPLICATIONS

This application is a continuation of International Application No. PCT/CN2019/110932, filed on Oct. 14, 2019, which claims priority to Chinese Patent Application No. 201811262866.4, filed on Oct. 27, 2018. The disclosures of the aforementioned applications are hereby incorporated by reference in their entireties.

TECHNICAL FIELD

The present invention relates to the field of communications technologies, and in particular, to a packet processing method, a related device, and a computer storage medium.

BACKGROUND

When segment routing (SR) is deployed over an internet protocol version 6 (IPv6), the segment routing is referred to as SRv6. The SRv6 extends a segment routing header (SRH) based on the IPv6, to implement data communication. The SRH includes segment identifiers (SID) of a series of network nodes. In an actual communication process, it is found that a format of the SID is not explicitly notified on an SRv6 network. This affects a network programming capability of the network nodes. For example, the network node cannot learn of the format of the SID, and cannot modify a related field in the format of the SID based on an actual service requirement, to carry corresponding function information. Therefore, this reduces the network programming capability of the network nodes.

SUMMARY

Embodiments of the present invention disclose a packet processing method, a related device, and a computer storage medium, to resolve a prior-art problem, for example, a poor network programming capability.

According to a first aspect, an embodiment of the present invention discloses a packet processing method, applied to a first network node side of a packet processing system. The method includes: A first network node receives a first packet sent by a second network node, where the first packet includes a format of a segment identifier of the second network node, obtains the format of the segment identifier of the second network node based on the first packet, where the segment identifier of the second network node includes a locator field, a function field, and a first field, and the first network node determines a value of the first field in the segment identifier of the second network node according to a segment routing policy, and adds the determined value of the first field to a second packet sent to the second network node, where the determined value of the first field is used to indicate the second network node to process the second packet.

In some possible embodiments, the format of the segment identifier of the second network node may describe a location and a length of each field in the segment identifier of the second network node, but does not describe a value of each field in the segment identifier of the second network node. In other words, the value of the first field is not described in the format of the segment identifier of the second network node. Optionally, the format of the segment identifier of the second network node may also describe the value of each field in the segment identifier of the second network node, for example, the value of the first field. There may be one or more values of the first field. When there is one value of the first field, the value of the first field may also be referred to as a specific value. The specific value may be specifically a system-defined default value (for example, 0), or may be a value of the single first field that is different from the default value, or the like.

In some possible embodiments, the first network node may receive the segment identifier of the second network node that is sent by the second network node, where the segment identifier of the second network node includes the value of the first field. There may be one or more values of the first field. When there are a plurality of values of the first field that are supported by the second network node, there are a plurality of corresponding segment identifiers of the second network node, and a segment identifier of each second network node includes one value of the first field.

In some possible embodiments, the first network node may obtain, based on the segment identifier of the second network node and the format of the segment identifier of the second network node, a value supported by the first field in the segment identifier of the second network node. There may be one or more values of the first field. Specifically, the second network node may describe, in the format of the segment identifier of the second network node, one or more values supported by the first field. When the segment identifier of the second network node is advertised, the value of the first field included in the segment identifier of the second network node may be a specific value, for example, a default value. Alternatively, the second network node may advertise, by using the segment identifier of the second network node, the value of the first field that is supported by the second network node. When there are a plurality of values of the first field, the second network node may advertise a plurality of segment identifiers of the second network node, and one segment identifier correspondingly carries one value of the first field. In this case, in the format of the segment identifier of the second network node that is advertised by the second network node, the value supported by the first field in the segment identifier of the second network node may not be described, or the like.

Optionally, to ensure security and reliability of information transmission, the second network node may announce, by using the segment identifier of the second network node and the format of the segment identifier of the second network node, the value of the first field that is supported by the second network node. In other words, the format of the segment identifier of the second network node that is advertised by the second network node describes one or more values supported by the first field in the segment identifier of the second network node. In addition, when announcing the segment identifier of the second network node, the second network node may further add the value of the first field to the segment identifier of the second network node and advertise the segment identifier again. Likewise, when there are the plurality of values of the first field, the second network node may advertise the plurality of segment identifiers of the second network node, to advertise the plurality of values of the first field that are correspondingly carried in the plurality of segment identifiers of the second network node. A segment identifier of one second network node includes or carries a value of one first field.

In some possible embodiments, when the value of the first field included in the segment identifier of the second network node is a specific value, the first network node modifies the value of the first field according to the segment routing policy, and uses a modified value as the determined value of the first field.

Alternatively, when the segment identifier of the second network node includes the value of the first field, and there are a plurality of values of the first field, the first network node selects, according to the segment routing policy, a value that matches the segment routing policy from the plurality of values of the first field, and uses the value as the determined value of the first field.

In some possible embodiments, the first field includes a flag field, which is used to indicate a network performance parameter type. The value of the flag field is further used to indicate the second network node to add a network performance parameter corresponding to the network performance parameter type to the second packet.

In some possible embodiments, when the second network node supports segment routing over internet protocol version 6 SRv6, the value of the flag field is specifically used to indicate the second network node to add the network performance parameter corresponding to the network performance parameter type of the second network node to the second packet, for example, add the network performance parameter to the segment identifier of the second network node or a segment identifier of a third network node. The third network node is a next-hop node of the second network node on a packet forwarding path. Optionally, the network performance parameter may be further added to another field of the second packet, for example, a type length value (TLV) field.

In some possible embodiments, when the second network node supports an internet protocol version 6 IPv6, the value of the flag field is specifically used to indicate the second network node to add the network performance parameter corresponding to the network performance parameter type to a field, other than the segment identifier of the second network node, in the second packet, for example, add the network performance parameter to the TLV field, or another field of a field identifier of a non-network node.

In some possible embodiments, the network performance parameter includes at least one of the following: a time point at which the second network node sends the second packet, a quantity of service packets received by the second network node before sending the second packet, where the service packet and the second packet belong to a same data flow, a queue length of a packet sending queue of the second network node, where the packet sending queue is a queue in which the second packet is stored, and a communications interface used by the second network node to transmit the second packet.

In some possible embodiments, the first field includes a network slice field. A value of the network slice field is used to indicate a network slice identifier, and the value of the network slice field is further used to indicate the second network node to process the second packet based on the network slice identifier. The network slice identifier is used to identify a network slice used when the second packet is transmitted.

In some possible embodiments, the first field occupies the $56^{th}$ bit to the $63^{rd}$ bit in the format of the segment identifier of the second network node, the locator field occupies the $1^{st}$ bit to the $55^{th}$ bit in the format of the segment identifier of the second network node, and the function field occupies the $64^{th}$ bit to the $128^{th}$ bit in the format of the segment identifier of the second network node.

In some possible embodiments, a quantity of first fields is not limited. When there are a plurality of first fields, one first field in the plurality of first fields is a flag field, and another first field in the plurality of first fields is a network slice field. The value of the flag field is used to indicate a network performance parameter type, and is further used to indicate the second network node to add a network performance parameter corresponding to the network performance parameter type to the second packet. The value of the network slice field is used to indicate a network slice identifier, and is further used to indicate the second network node to process the second packet based on the network slice identifier. The network slice identifier is used to identify a network slice used when the second packet is transmitted.

According to a second aspect, an embodiment of the present invention provides another packet processing method, applied to a second network node side of a packet processing system. The method includes: A second network node determines a format of a segment identifier of the second network node, where the segment identifier of the second network node includes a first field, sends a first packet to a first network node, where the first packet includes the format of the segment identifier of the second network node, so that the first network node determines a value of the first field in the segment identifier of the second network node according to the segment routing policy, and adds the determined value of the first field to a second packet sent to the second network node.

In some possible embodiments, when the value of the first field included in the segment identifier of the second network node is a specific value, the determined value of the first field is obtained by the first network node by modifying the value of the first field in the format of the segment identifier of the second network node according to the segment routing policy. Alternatively, when the format of the segment identifier of the second network node includes the value of the first field, and there are a plurality of values of the first field, the determined value of the first field is a value that matches the segment routing policy and that is selected by the first network node from the plurality of values of the first field according to the segment routing policy.

In some possible embodiments, the first field includes a flag field, and a value of the flag field is used to indicate a network performance parameter type. The value of the flag field is further used to indicate the second network node to add a network performance parameter corresponding to the network performance parameter type to the second packet.

In some possible embodiments, the first field includes a network slice field, and a value of the network slice field is used to indicate a network slice identifier. The value of the network slice field is further used to indicate the second network node to process the second packet based on the network slice identifier, and the network slice identifier is used to identify a network slice used when the second packet is transmitted.

According to a third aspect, an embodiment of the present invention provides another packet processing method, applied to a packet processing system including a first network node and a second network node. The method includes: The second network node sends a first packet to the first network node, where the first packet includes a format of a segment identifier of the second network node, the format is used to describe a length and a location of each field in the segment identifier of the second network node, and the segment identifier of the second network node includes a network slice field, the second network node receives a second packet sent by the first network node, where the second packet includes the segment identifier of the second network node, the segment identifier of the second network node includes a value of the network slice field, and the value of the network slice field is determined by the first network node according to a segment routing policy, and the second network node processes the second packet based on the value of the network slice field.

In some possible embodiments, the value of the network slice field is used to indicate a network slice identifier, and the second network node processes the second packet based on a network service provided by a network slice corresponding to the network slice identifier.

In some possible embodiments, the network slice identifier is carried in the network slice field in the segment identifier of the second network node in the second packet.

According to a fourth aspect, an embodiment of the present invention provides another packet processing method, applied to a packet processing system including a first network node and a second network node. The method includes: The second network node sends a first packet to the first network node, where the first packet includes a format of a segment identifier of the second network node, the format is used to describe a length and a location of each field in the segment identifier of the second network node, and the segment identifier of the second network node includes a flag field, the second network node receives a second packet sent by the first network node, where the second packet includes a value of the flag field, the value is used to indicate a network performance parameter type, and the value of the flag field is determined by the first network node based on a segment routing policy and the format of the segment identifier of the second network node, and the second network node adds a network performance parameter of the second network node to the second packet, where the network performance parameter is a network performance parameter corresponding to the network performance parameter type.

In some possible embodiments, when the second network node supports segment routing over internet protocol version 6 SRv6, the second network node adds the network performance parameter of the second network node to the segment identifier of the second network node in the second packet.

In some possible embodiments, when the second network node supports an internet protocol version 6 IPv6, the second network node adds the network performance parameter of the second network node to a byte, other than the segment identifier of the second network node, in the second packet.

In some possible embodiments, the network performance parameter type is carried in the flag field in the segment identifier of the second network node in the second packet.

In some possible embodiments, the network performance parameter includes at least one of the following: a time point at which the second network node sends the second packet, a quantity of service packets received by the second network node before sending the second packet, where the service packet and the second packet belong to a same data flow, a queue length of a packet sending queue of the second network node, where the packet sending queue is a queue in which the second packet is stored, and a communications interface used by the second network node to transmit the second packet.

According to a fifth aspect, an embodiment of the present invention provides a first network device, applied to a packet processing system. The first network device includes a communications module and a processing module.

The communications module is configured to receive a first packet sent by a second network node. The first packet includes a format of a segment identifier of the second network node, and the format of the segment identifier of the second network node is used to describe a length and a location of each field in the segment identifier of the second network node.

The processing module is configured to obtain the format of the segment identifier of the second network node based on the first packet. The segment identifier of the second network node includes a first field.

The processing module is further configured to: determine a value of the first field in the segment identifier of the second network node according to a segment routing policy and the format of the segment identifier of the second network node, and add the determined value of the first field to a second packet sent to the second network node. The determined value of the first field is used to indicate the second network node to process the second packet.

For content that is not described or not shown in this embodiment of the present invention, correspondingly refer to related descriptions in the embodiment in the first aspect. Details are not described herein again.

According to a sixth aspect, an embodiment of the present invention provides a second network device, applied to a packet processing system. The second network device includes a communications module and a processing module.

The processing module is configured to determine a format of a segment identifier of the second network node. The format of the segment identifier of the second network node is used to describe a length and a location of each field in the segment identifier of the second network node, and the segment identifier of the second network node includes a first field.

The communications module is configured to send a first packet to a first network node. The first packet includes the format of the segment identifier of the second network node, and the format of the segment identifier is used by the first network node to: determine a value of the first field in the segment identifier of the second network node according to a segment routing policy, and add the determined value of the first field to a second packet sent to the second network node.

For content that is not shown or not described in the present invention, correspondingly refer to related descriptions in the embodiment in the second aspect. Details are not described herein again.

According to a seventh aspect, an embodiment of the present invention provides another second network device, applied to a packet processing system. The second network device includes a communications module and a processing module.

The communications module is configured to send a first packet to the first network node. The first packet includes a format of a segment identifier of the second network node, the format of the segment identifier of the second network node is used to describe a length and a location of each field in the segment identifier of the second network node, and the segment identifier of the second network node includes a network slice field.

The communications module is further configured to receive a second packet sent by the first network node. The second packet includes the segment identifier of the second network node, the segment identifier of the second network node includes a value of the network slice field, and the value of the network slice field is determined by the first network node according to a segment routing policy.

The processing module is configured to process the second packet based on the value of the network slice field.

For content that is not shown or not described in the present invention, refer to related descriptions in the embodiment in the third aspect. Details are not described herein again.

According to an eighth aspect, an embodiment of the present invention provides another second network device, applied to a packet processing system and including a communications module and a processing module.

The communications module is configured to send a first packet to a first network node. The first packet includes a format of a segment identifier of the second network node, the format of the segment identifier of the second network node is used to describe a length and a location of each field in the segment identifier of the second network node, and the segment identifier of the second network node includes a flag field.

The communications module is further configured to receive a second packet sent by the first network node. The second packet includes a value of the flag field, the value of the flag field is determined by the first network node according to a segment routing policy, and the value of the flag field is used to indicate a network performance parameter type.

The processing module is configured to add a network performance parameter of the second network node to the second packet. The network performance parameter is a network performance parameter corresponding to the network performance parameter type.

For content that is not shown or not described in the present invention, refer to related descriptions in the embodiment in the fourth aspect. Details are not described herein again.

According to a ninth aspect, an embodiment of the present invention provides a network device, applied to a packet processing system. The network device may be specifically a first network device, including a processor and a memory. The memory is configured to store an instruction. The processor is configured to invoke the instruction in the memory, to perform the method described in any one of the first aspect or the possible implementations of the first aspect. Optionally, the first network device may further include a communications interface and a bus. The processor, the communications interface, and the memory communicate with each other by using the bus. The communications interface is configured to receive and send data.

According to a tenth aspect, an embodiment of the present invention provides a network device, applied to a packet processing system. The network device may be specifically a second network device, and includes a processor and a memory. The memory is configured to store an instruction. The processor is configured to invoke the instruction in the memory, to perform the method described in any one of the second aspect to the fourth aspect and the possible implementations of the aspect. Optionally, the second network device may further include a communications interface and a bus. The processor, the communications interface, and the memory communicate with each other by using the bus. The communications interface is configured to receive and send data.

According to an eleventh aspect, an embodiment of the present invention provides a packet processing system. The system includes a first network node and a second network node. The first network node is configured to perform the method steps described in the first aspect and any possible implementation of the first aspect. The second network node is configured to perform the method steps described in any one of the second aspect to the fourth aspect and any possible implementation of the any one of the second aspect to the fourth aspect. For example, the second network node is configured to send a first packet to the first network node, where the first packet includes a format of the second network node, and the format is used to describe a length and a location of each field in a segment identifier of the second network node, the first network node is configured to: receive the first packet, and obtain the format of the segment identifier of the second network node based on the first packet, where the segment identifier of the second network node includes a first field, and the first network node is further configured to: determine a value of the first field in the segment identifier of the second network node based on a segment routing policy and the format of the segment identifier of the second network node, and add a determined value of the first field to a second packet sent to the second network node.

The first packet may be specifically a control packet transmitted on a control plane, for example, an IGP packet or an ICMP packet. The second packet is a data packet transmitted on the data plane.

For a part that is not shown or not described in this embodiment of the present invention, refer to related descriptions in the foregoing method embodiments. Details are not described herein again.

According to a twelfth aspect, a computer non-transitory storage medium is provided. The computer non-transitory storage medium stores program code used for packet processing. The program code includes an instruction used to perform the method in any one of the first aspect or the possible implementations of the first aspect.

According to a thirteenth aspect, a computer non-transitory storage medium is provided. The computer non-transitory storage medium stores program code used for packet processing. The program code includes an instruction used to perform the method described in any one of the second aspect to the fourth aspect.

According to a fourteenth aspect, a chip product is provided, to perform the method in any one of the first aspect or the possible implementations of the first aspect.

According to a fifteenth aspect, a chip product is provided, to perform the method in any one of the second aspect to the fourth aspect or any possible implementation of any one of the second aspect to the fourth aspect.

Based on the implementations provided in the foregoing aspects, in the present invention, the implementations may be further combined to provide more implementations.

BRIEF DESCRIPTION OF THE DRAWINGS

To describe the technical solutions in the embodiments of the present invention or in the prior art more clearly, the following briefly describes the accompanying drawings for describing the embodiments or the prior art.

FIG. 1 is a schematic diagram of a format of a segment routing header according to an embodiment of the present invention;

FIG. 2 is a schematic diagram of a format of a segment identifier according to an embodiment of the present invention;

FIG. 3A to FIG. 3D are schematic diagrams of formats of a plurality of fields in a segment identifier according to an embodiment of the present invention;

DETAILED DESCRIPTION OF ILLUSTRATIVE EMBODIMENTS

Figure 4A:
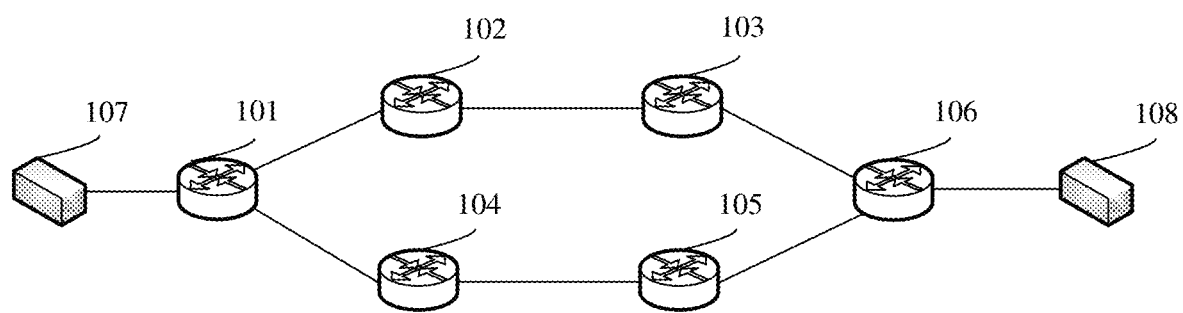
FIG. 4A and FIG. 4B are schematic diagrams of two application scenarios according to an embodiment of the present invention.

The following describes the embodiments of the present invention with reference to accompanying drawings.

The following describes some technical concepts or technical terms used in the embodiments of this application.

(1) Segment Routing Header SRH

FIG. 1 is a schematic diagram of a format of the SRH. As shown in FIG. 1, the SRH includes a next header field, a header length field, a routing type field, a segments left field, a last entry field, a flags field, a tag field, and a segment list field.

The next header field occupies 8 bits, and is used to identify a type of a next header.

The Hdr Ext Len field occupies 8 bits, and indicates a length of the SRH in 8-byte units.

The routing type field occupies 8 bits, and indicates that carried information is source routing information.

The segments left field occupies 8 bits, and identifies a number of a next segment identifier SID to be viewed. An initial value of the segments left field is n−1, where n represents a quantity of segment identifiers in the SRH, in other words, a quantity of network nodes on a forwarding path of the SRH. Each time the SRH passes through a network node, the value of the segments left field decreases by 1 until the value becomes 0. When the value of the segments left field is 0, it indicates that the SRH is sent to a last-hop node on the forwarding path.

The last entry field occupies 8 bits, and indicates a number of a segment identifier SID of a last network node on the forwarding path of the SRH, where the number is 0.

The flags field occupies 8 bits, and indicates flags information.

The tag field occupies 16 bits, and is used to mark a group of packets (or SRHs) having a same attribute.

The segment list (segment list [0] to segment list [n]) field indicates that network nodes on a packet forwarding path are arranged in descending order of distance. The segment list [0] is a segment identifier (SID) of a last network node on the packet forwarding path. The segment list [1] is a segment identifier of a penultimate network node on the packet forwarding path, and the rest may be deduced by analogy. The segment list indicates the segment list.

Optionally, the SRH may further include options, which may also be referred to as optional type length value objects. The option may be set by a system in a self-defined manner, and a meaning indicated by the option may be defined based on an actual service requirement. This is not limited in the present invention.

(2) Segment Identifier (SID)

In a packet forwarding process on an SRv6 network, an ingress device of the SRv6 network adds a segment routing header (SRH) to a packet, and the SRH includes a segment list used to identify a forwarding path. The segment list includes a segment identifier (SID) of a network node supporting a SRv6 function on the packet forwarding path. The segment identifier is a 128-bit IPv6 address. Therefore, the segment identifier of the network node may also be referred to as an IPv6 address of the network node.

The ingress device for forwarding a packet on the SRv6 network may also be referred to as an ingress node or an ingress provider edge (PE) device. The segment list may also be referred to as a segment list or a SID list.

In the present invention, the SID includes a locator field, a function field, and a first field (which may also be referred to as a self-defined field) defined by another system. Positions of the locator field, the function field, and the first field in the SID, and quantities of bytes occupied by each of the locator field, the function field, and the first field are not limited in the present invention. A quantity of first fields is not limited either. For example, the SID may include n first fields, where n is a positive integer. An example in which the SID includes one first field is used below. FIG. 2 is a schematic diagram of a possible format of the SID. As shown in FIG. 2, the SID includes a locator field, a function field, and a first field.

The locator field occupies 0 to 55 bits, and is used to store a prefix of an IPv6 address for packet forwarding and routing. The locator field can also be used to identify a network node. For example, the forwarding node may forward, based on the locator field included in the SID, the packet to a network node corresponding to the SID.

The first field occupies 56 to 63 bits. In different application scenarios, the first field may indicate different meanings. Specifically, the meaning indicated by the first field may be configured according to an actual service scenario or based on a service requirement by a manager (or a management node) corresponding to the network node. This is not limited in the present invention.

For example, in a network slicing scenario, the first field may be configured as a network slice field, and is used to carry a network slice identifier for service communication. In this way, during packet transmission, the network node processes the packet based on a network slice indicated by the network slice identifier in the first field. For example, the network node forwards the packet based on a network service provided by the network slice. The network service includes but is not limited to a transmission latency, a transmission rate, a transmission bandwidth, a network throughput rate, a network throughput, or another network service used to ensure a specified quality of service (QoS) indicator.

In a network performance measurement scenario, the first field may be configured as a flag field, and is used to carry a network performance parameter type. In this way, during packet transmission, the network node adds a network performance parameter that is of the network node and that corresponds to the network performance parameter type to the packet, and sends, to another network node, the packet to which the network performance parameter is added. Correspondingly, the another network node may perform corresponding network performance calculation based on the received network performance parameter. Details are described below by using an example in this application.

The function field occupies 64 to 127 bits, and is used to indicate a network node corresponding to the SID to perform a corresponding function, for example, network performance calculation or packet forwarding. Details are described below in this application. For example, when the network node receives the packet, and a destination address of the packet is determined as an IPv6 address of the network node, in other words, a segment identifier of the network node, the network node performs a corresponding function based on a function in the segment identifier.

FIG. 3A to FIG. 3D are schematic diagrams of specific formats of related fields in a SID according to an embodiment of this application. FIG. 3A is a schematic diagram of a possible format of a locator field. As shown in FIG. 3A, the locator field includes a type subfield, a first length subfield, an offset subfield, a second length subfield, and a variable locator subfield. A location of each subfield included in the locator field and a quantity of bytes occupied by each subfield are not limited in this embodiment of this application.

The type subfield is used to define a type to which the current field belongs. When type=locator, it indicates that the field is defined as the locator field. The first length subfield is used to indicate a length occupied when the current field is described by using a type length value (TLV) format, and the occupied length may also be referred to as a length of the TLV. The offset subfield is used to define a start location of the current field in the SID, for example, starting from the $1^{st}$ bit of the SID. The second length subfield is used to define a length (a quantity of bits or a quantity of bytes) occupied by the current field in the SID. The variable locator is used to store a prefix of an IPv6 address for packet forwarding and routing, and may be used to identify a network node.

FIG. 3B is a schematic diagram of a possible format of a first field. As shown in FIG. 3B, the first field includes a type subfield, a first length subfield, an offset subfield, a second length subfield, and an optional sub-type length value subfield. A location of each subfield included in the first field and a quantity of bytes occupied by each subfield are not limited in this embodiment of this application.

When type=flag, it indicates that the first field is defined as a flag field. When type=network sliceID, it indicates that the first field is defined as a network slice field. Optionally, in different application scenarios, a manager corresponding to a network node may correspondingly define a function of the first field based on an actual service requirement. This is not limited in this embodiment of this application. The optional sub-type length value subfield is used to carry a value of the first field, and indicates information correspondingly indicated by the first field. For example, in a network slicing scenario, the first field may be the network slice field, a value of the network slice field is used to indicate a network slice identifier, and the value may be specifically carried in the optional sub-type length value subfield. For another example, in a network performance measurement scenario, the first field may be a flag field, a value of the flag field is used to indicate a network performance parameter type, and the value may be specifically carried in the optional sub-type length value subfield. In an actual application, there may be a plurality of values of the flag, which are used to identify different network performance parameter types. For example, the values of the flag may be as follows.

When the flag=1, it indicates that the network performance parameter type is a time type, and indicates that a network node that forwards the packet by using the segment identifier may add, to the packet, a time point at which the packet is sent.

When the flag=2, it indicates that the network performance parameter type is a type of a quantity of sent packets, and indicates that the network node that forwards the packet by using the segment identifier may add a quantity of received service packets to the packet, where the service packet and the packet belong to a same data flow, and may be specifically identified by using a segment list or a packet forwarding path.

When the flag=3, it indicates that the network performance parameter type is a queue occupancy type, and indicates that the network node that forwards the packet by using the segment identifier adds, to the packet, a queue depth (namely, a queue length) of a packet sending queue that stores the packet, where the queue depth may be indicated by a queue occupancy rate or the queue length. The packet sending queue may include but is not limited to a first in first out queue, a first in last out queue, and the like.

When the flag=4, it indicates that the network performance parameter type is an interface type, and indicates that the network node that forwards the packet by using the segment identifier adds a communications interface of the packet to the packet, where the communications interface may be specifically a receiving interface used for receiving the packet, or may be a sending interface used for sending the packet.

For related descriptions of other subfields in the first field, refer to the related descriptions in the embodiment in FIG. 3A. Details are not described herein again. Related embodiments related to the network performance parameter type and the network slice identifier are specifically described in detail below in this application.

FIG. 3C is a schematic diagram of a possible format of an optional sub-type length value (optional sub-tlvs) field. As shown in FIG. 3C, the field includes a type, a length, and a value. The type herein refers to a type supported by the first field, for example, the time type, the type of the quantity of sent packets, the queue occupation type, and the interface type described above. The length is a length occupied by the optional sub-tlvs in the first field, for example, 2 bytes. The value herein may be specifically a value of the type. Different types correspond to different values, and represent different meanings. For example, in the foregoing example, when the value of the type is 1, the type is specifically the time type or the like.

FIG. 3D is a schematic diagram of a possible format of a function field. As shown in FIG. 3D, the function field includes a type subfield, a first length subfield, an offset subfield, a second length subfield, and an optional sub-type length value (optional sub-tlvs) subfield. A location of each subfield included in the function field and a quantity of bytes occupied by each subfield are not limited in this embodiment of this application.

When type=function, the current field is defined as the function field. The optional sub-tlvs is used to carry a function that needs to be implemented by the function field defined by a system, and may also indicate the network node to execute a function corresponding to the field, for example, network performance calculation. Details are described below by using an example in this application. For details about other subfields related to the function field, refer to related descriptions in the embodiment in FIG. 3A. Details are not described herein again.

A segment identifier of the network node in this embodiment of this application may specifically include but is not limited to a node segment identifier, an adjacent segment identifier, and the like. For definitions of the segment list and the SID, refer to an SRv6-related draft disclosed by the internet engineering task force (IETF), for example, draft-filsfils-spring-srv6-network-programming-04. Related content in this document seems to be copied as a whole and is generally incorporated into this document by reference. If there is any contradiction or conflict with this document, the description in this document shall prevail. A controller in this embodiment of this application may be a network management device, or a controller in a software-defined networking (SDN) architecture. This is not limited in the embodiments of this application. The network node in this embodiment of this application may be specifically a network device, and may include but is not limited to a router, a switch, a forwarder in an SDN network, and the like.

The following describes two schematic diagrams of network frameworks to which the embodiments of this application are applicable. FIG. 4A is a schematic diagram of a possible network framework according to an embodiment of this application. As shown in FIG. 4A, the schematic diagram of the network framework is applied to an SRv6 network, and the SRv6 network may include network nodes that support an SRv6 function, for example, a network node 101 to a network node 106 in FIG. 4A.

On the SRv6 network, the network node supports the SRv6 function, in other words, the network node supports an IPv6 segment routing function. A segment identifier of the network node 101 is an SID 1, and the SID 1 is also an IPv6 address of the network node 101, for example, A::. A segment identifier of the network node 102 is an SID 2, and the SID 2 is also an IPv6 address of the network node 102, for example, B::. A segment identifier of the network node 103 is an SID 3, and the SID 3 is also an IPv6 address of the network node 103, for example, C::. A segment identifier of the network node 106 is an SID 6, and the SID 6 is also an IPv6 address of the network node 106, for example, D::. When a packet is forwarded from the network node 101 to the network node 106, the network node 101 is referred to as an ingress node of the SRv6 network, and the network node 106 is referred to as an egress node of the SRv6 network.

Optionally, the schematic diagram of the network framework may further include user equipment 107 and user equipment 108. The user equipment 107 may communicate with the network node 101 through the network, and the user equipment 108 may also communicate with the network node 106 through the network.

Figure 4B:
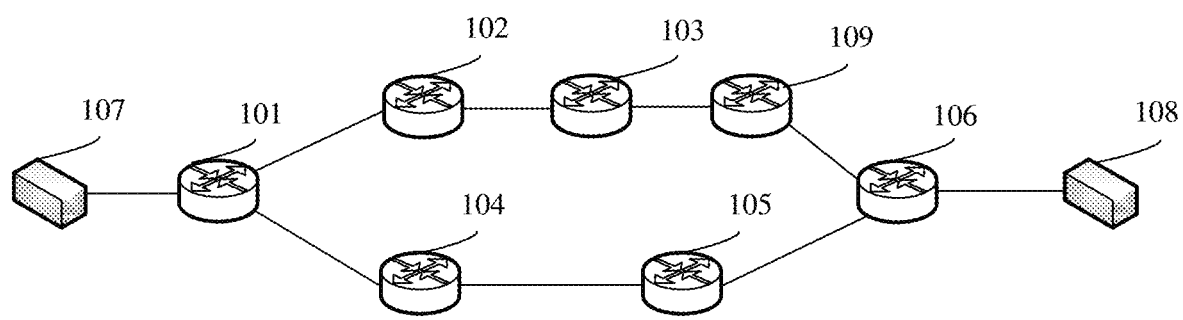

FIG. 4B is a schematic diagram of another possible network framework according to an embodiment of this application. As shown in FIG. 4B, the schematic diagram of the network framework is applied to an IPv6 network, and may include a network node that supports an SRv6 function and a network node that does not support the SRv6 function. As shown in FIG. 4B, the network nodes that support the SRv6 function may include a network node 101 to a network node 106. For details, refer to related descriptions in FIG. 4A. The network node that does not support the SRv6 function may include a network node 109.

In an actual communication process, because the network nodes 101 to 106 support the SRv6 function, in a packet forwarding process, the network node may modify a related field in a segment identifier of the network node in a packet, to carry corresponding information, and forward the modified packet to a next network node. However, the network node 109 does not support the SRv6 function, and does not have the segment identifier. Therefore, in the packet forwarding process, the network node 109 may add information about the network node to another field of the packet, and send the packet to a next network node. Alternatively, the network node 109 may directly forward the packet, and the like. How the network node implements information modification or addition of the packet is specifically described in detail in the following.

Optionally, the schematic diagram of the network framework in this embodiment of this application also includes user equipment 107 and user equipment 108. The user equipment 107 may communicate with the network node 101 through a network, and the user equipment 108 may communicate with the network node 106 through the network. For content that is not shown or not described in this embodiment of this application, refer to related descriptions in the embodiment in FIG. 4A. Details are not described herein again.

Figure 5:
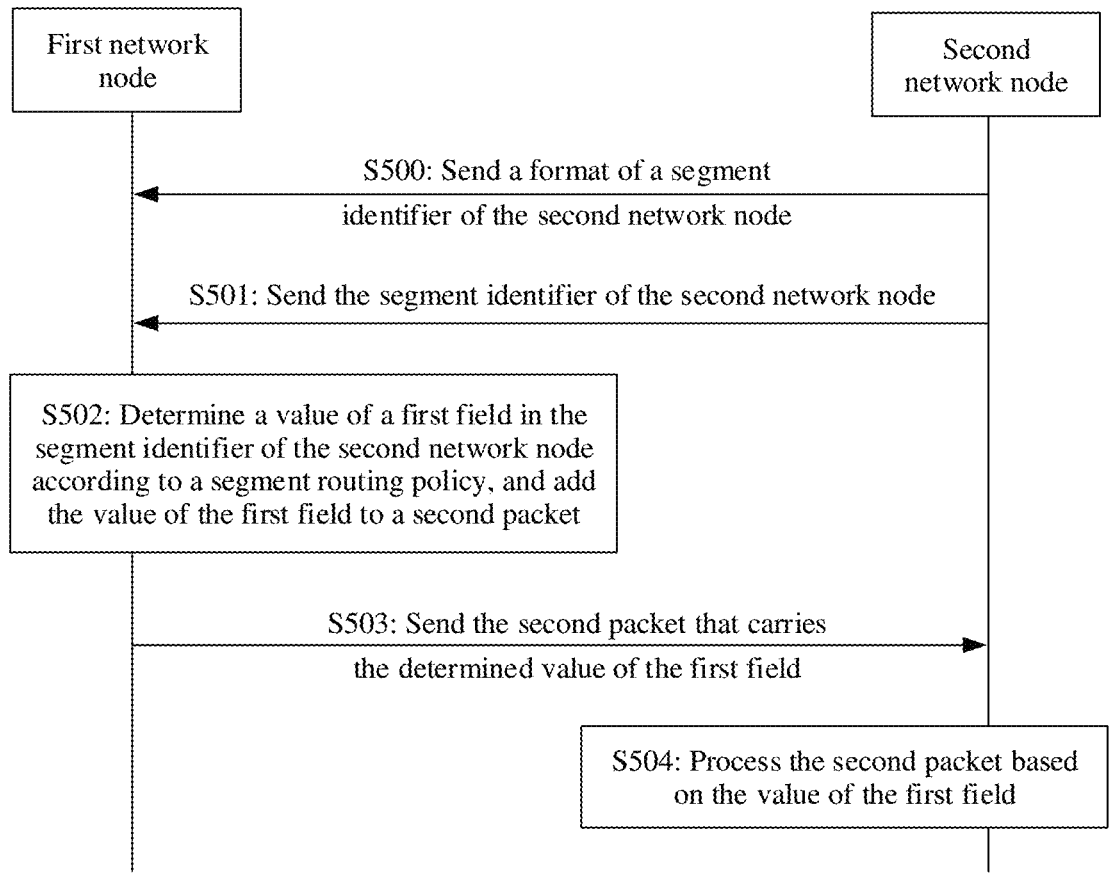
FIG. 5 is a schematic flowchart of a packet processing method according to an embodiment of the present invention.

The following describes a packet processing method provided in an embodiment of this application. FIG. 5 is a schematic flowchart of a packet processing method according to an embodiment of this application. The method shown in FIG. 5 may include the following implementation steps.

Step S500: A second network node sends a format of a segment identifier of the second network node to a first network node. Correspondingly, the first network node receives the format of the segment identifier of the second network node. The format of the segment identifier of the second network node is used to describe a location and a length of each field included in the segment identifier of the second network node.

In this embodiment of this application, any network node that supports an SRv6 function on a network may advertise a format of a segment identifier of the network node to another node (for example, an ingress node) on the network or a controller on the network. The format of the segment identifier of the network node is used to describe a location and a length of each field included in the segment identifier of the network node. Optionally, the format of the segment identifier of the network node may further describe information, for example, a value of a related field in the segment identifier of the network node. For example, in the format of the segment identifier of the network node, the 0 bit to the $55^{th}$ bit in the segment identifier of the network node are a locator field, and the $56^{th}$ bit to the $63^{rd}$ bit are a first field. The first field is described in a TLV format, and includes a plurality of subfields. A value of the first field may be specifically carried in an optional sub-tlvs subfield. For the specific format of the segment identifier of the network node, refer to related descriptions in the foregoing embodiment. Details are not described herein again.

Formats of segment identifiers of different network nodes may be the same or may be different, and may be determined based on an actual service requirement corresponding to the network node. For example, the format of the segment identifier of the network node may describe the locator field, a function field, the first field, and the like included in the segment identifier of the network node. In different service scenarios, the first field may be configured based on the actual service requirement, to indicate different meanings. In an actual application, in a same service scenario, formats of segment identifiers of all network nodes on the network are usually the same.

For example, in a network slicing scenario, the format of the segment identifier of the network node describes the locator field, the function field, and the first field included in the segment identifier of the network node. The first field may be specifically a network slice field, which is used to indicate or carry a network slice identifier used when the network node communicates. For another example, in a network performance measurement scenario, the format of the segment identifier of the network node describes the locator field, the function field, and the first field included in the segment identifier of the network node. The first field may be specifically a flag field, which is used to carry or indicate a network performance parameter type. For a specific format of the segment identifier of the network node, refer to related descriptions in the foregoing embodiment. Details are not described herein again.

In this embodiment of this application, that the second network node on the network advertises the format of the segment identifier to the ingress node (the first network node) is used as an example herein. The second network node may advertise the format of the segment identifier of the second network node to the first network node.

Specifically, the second network node sends the first packet to a first network node, where the first packet includes the format of the segment identifier of the second network node. The format of the segment identifier of the second network node is specifically used to describe a location and a length of each field included in the segment identifier of the second network node. For example, the format of the segment identifier of the second network node may describe the locator field, the function field, and the first field included in the segment identifier of the second network node. The format of the segment identifier of the second network node may be specifically encapsulated in the first packet by using a type-length-value (TLV) field.

Optionally, the format of the segment identifier of the second network node may further describe a value supported by a related field in the segment identifier of the second network node, for example, the value of the first field. In an actual application, there may be one or more values of the first field. Correspondingly, one or more values supported by the first field are described in the format of the segment identifier of the second network node. When there is one value of the first field, the value of the first field may be a specific value, for example, 0. When there are a plurality of values of the first field, the plurality of values of the first field may be encapsulated in the first packet by using a plurality of TLV fields, and the first packet is sent to the first network node.

For example, in the network slicing scenario, the format of the segment identifier of the second network node may be specifically used to describe the locator field, the function field, and the network slice field included in the segment identifier of the second network node. Optionally, the format of the segment identifier of the second network node may further describe a value of the network slice field. In an actual application, the format of the segment identifier of the second network node usually describes that the value of the network slice field is a specific value, and the specific value is a default value set by a system, for example, 0. Optionally, the format of the segment identifier of the second network node may also describe a plurality of values supported by the network slice field, so that during subsequent actual communication, one value is selected from the plurality of values of the network slice field, to perform data transmission by using a network slice that is correspondingly indicated by the value. The value of the network slice field is used to indicate a network slice identifier, and indicates that a network slice corresponding to the network slice identifier is used for communication during data transmission.

In the network performance measurement scenario, the format of the segment identifier of the second network node is specifically used to describe the locator field, the function field, and the flag field included in the segment identifier of the second network node. In addition, the format of the segment identifier of the second network node may further a value of the flag field. In an actual application, the format of the segment identifier of the second network node describes a plurality of values supported by the flag field, and each value of the flag field represents one type of the network performance parameter type. For the value of the flag field and a meaning of the value, refer to related descriptions in the foregoing embodiment. Details are not described herein again.

In an actual application, the first packet may be specifically a control packet, and may include but is not limited to an interior gateway protocol (IGP) packet, an internet control message protocol (ICMP), or another protocol packet related to a control plane.

Step S501: The second network node sends the segment identifier of the second network node to the first network node. Correspondingly, the first network node receives the segment identifier of the second network node. The segment identifier of the second network node includes a value of each field, for example, a value of a locator field, a value of the function field, and the value of the first field.

As described in the step S500, any network node supporting the SRv6 function on the network may send a format of a segment identifier of the network node to another node on the network, to notify information such as the location and the length of each field included in the segment identifier of the network node. In an actual service communication process, any network node that supports the SRv6 function on the network may send the segment identifier of the network node to another node on the network. The segment identifier of the network node includes the value of each field, to indicate or notify corresponding information. For example, the value of the locator field is used to indicate a next-hop routing address of the packet. When a field in the segment identifier of the network node supports a plurality of values, the plurality of values can be advertised by using a plurality of segment identifiers of the network node. That there are the plurality of values of the first field is used as an example. The network node may send the plurality of segment identifiers of the network node, and each segment identifier of the network node includes one value of the first field.

In this application, an example in which the second network node advertises the segment identifier of the second network node to the first network node is used to describe related content. Specifically, the second network node sends, to the first network node, the segment identifier of the second network node that is supported by the second network node. A quantity of segment identifiers of the second network node is not limited in this embodiment of this application. The segment identifier of the second network node includes a value of a related field, for example, the value of the first field. When there are a plurality of segment identifiers of the second network node, the second network node may advertise the plurality of segment identifiers of the second network node by using one or more packets. For example, when one packet is used to advertise the plurality of segment identifiers of the second network node, the packet includes the plurality of TLV fields, and each TLV field is used to carry/advertise one segment identifier of the second network node. When the plurality of packets are used to advertise the plurality of segment identifiers of the second network node, each packet may be used to carry or advertise one segment identifier of the second network node. The packet herein may be specifically the control packet or the data packet. For details of the control packet, refer to related descriptions in the foregoing embodiment. This is not limited in this application.

In other words, the second network node may advertise, to the first network node by using the step S500 and/or the step S501, the value supported by the related field in the segment identifier of the second network node, for example, the value of the first field. The field may support one or more values. Specifically, there are the following several implementations.

In a first implementation, the format of the segment identifier of the second network node that is advertised by the second network node does not describe the value of the first field, or describes that the value of the first field is a default value. The default value may also be referred to as a default value, and may be specifically set by a system in a self-defined manner, for example, 0. The default value indicates a value that has no actual meaning by default. In this case, the segment identifier of the second network node that is advertised by the second network node may include the value of the first field, and the value of the first field is not limited. Generally, the value of the first field is no longer the default value. When the second network node supports the plurality of values of the first field, the second network node may correspondingly advertise the plurality of segment identifiers of the second network node, to advertise the plurality of values of the first field to the first network node. The segment identifier of each second network node includes one value of the first field.

In a second implementation, the format of the segment identifier of the second network node that is advertised by the second network node describes the value supported by the first field (in other words, the value of the first field), and there may be one or more values of the first field. When there is one value of the first field, the value of the first field may be a specific value. The specific value may be specifically a single value of the first field that is different from the default value. For example, when the default value is 0, the specific value may be 1 or 2. In this case, when announcing the segment identifier of the second network node, the second network node may advertise the segment identifier including the value of the first field with the default value, to save transmission resources. Correspondingly, the first network node may obtain the segment identifier of the second network node based on the value of the first field that is described in the format of the segment identifier of the second network node and based on the segment identifier that is of the second network node and that includes the value of the first field with the default value. When there are the plurality of values of the first field, the first network node may obtain the plurality of segment identifiers of the second network node based on the plurality of values of the first field that are described in the format and based on the segment identifier that is of the second network node and that includes the value of the first field with the default value. The segment identifier of each second network node includes one value of the first field, in other words, the plurality of segment identifiers of the second network node corresponding to the plurality of values of the first field are obtained.

In a third implementation, the format of the segment identifier of the second network node that is advertised by the second network node describes the value of the first field, and there may be one or more values of the first field. In this case, if an overhead of a transmission resource is not considered, when announcing the segment identifier of the second network node, the second network node may further advertise, by using one or more corresponding segment identifiers of the second network node, the one or more values of the first field that are described in the format. The segment identifier of each second network node includes one value of the first field. In other words, when there is one value of the first field, the second network node may advertise one segment identifier of the second network node, and the segment identifier includes the value of the first field. When there are the plurality of values of the first field, the second network node may correspondingly advertise the plurality of segment identifiers of the second network node, to advertise the plurality of values of the first field to the first network node. Optionally, when announcing the segment identifier of the second network node, the second network node may advertise some or all values of the first field in the plurality of values of the first field again by using the segment identifier of the second network node. This is not limited in this embodiment of this application.

For example, in a network measurement scenario, the second network node usually describes the value of the first field (namely, the flag field) in the format of the segment identifier of the second network node. When the segment identifier of the second network node is advertised to the first network node, the value of the first field that is carried in the segment identifier of the network node is the default value. Correspondingly, the first network node may obtain the one or more segment identifiers of the second network node based on the one or more values of the first field that are described in the format and based on the advertised segment identifier that is of the second network node and that carries the value of the first field with the default value, where the segment identifier of each second network node includes one value of the first field, in other words, obtain the one or more values of the first field.

In the network slicing scenario, the second network node may not describe the value of the first field (the network slice field) in the format of the segment identifier of the second network node. Correspondingly, when announcing the segment identifier of the second network node, the second network node adds the value of the first field to the segment identifier of the second network node, and advertises the segment identifier to the first network node. When there are the plurality of values of the first field, the second network node may advertise the plurality of segment identifiers of the second network node to the first network node, and each segment identifier includes one value of the first field. In this way, the first network node can learn of the plurality of values of the first field that are supported by the second network node.

In an actual application, to save transmission resources, by default, the value of the first field in the segment identifier of the second network node may be the default value, for example, 0. In this case, the second network node sends one segment identifier of the second network node to the first network node, and the value of the first field in the segment identifier is the default value. Correspondingly, to reduce flooding traffic, the segment identifiers of the second network node may have the plurality of values of the first field, and the plurality of values may be determined based on a use frequency of values supported in an actual service scenario.

In this case, the second network node may send the plurality of segment identifiers of the second network node to the first network node, to advertise the plurality of values of the first field that are supported by the segment identifiers of the second network node.

For example, in the network slicing scenario, a packet processing system provides five network slices for transmitting a packet, and network slice identifiers of the five network slices are 0 to 5, respectively. In a low-latency service, to meet a low-latency requirement for packet transmission, network slice identifiers used for packet transmission may be 0 to 3, which are three network slices. Correspondingly, to reduce flooding (or to reduce transmission resources), the second network node may advertise, to the first network node, that there are four values of the first field, which may be 0 to 3 herein, and specifically indicate the network slice identifiers 0 to 3. In other words, the second network node may advertise four segment identifiers of the second network node to the first network node, and each segment identifier includes one value of the first field.

Step S502: The first network node determines the value of the first field in the segment identifier of the second network node according to a segment routing policy. The first network node adds the determined value of the first field to a second packet sent to the second network node. The determined value of the first field is used to indicate the second network node to process the second packet.

In this application, the segment routing policy may be specifically generated by the first network node (the ingress node) or the controller based on the actual service requirement. The segment routing policy is used to indicate configuration and routing of the packet. When the segment routing policy is generated by the controller, the first network node may obtain the segment routing policy from the controller.

Optionally, the segment routing policy may specifically include a configuration policy and a routing policy. In an actual application, the two policies may be combined or split into one or more policies for implementation. The routing policy is specifically used to indicate the routing of the packet, for example, indicate a forwarding path of the packet or indicate a segment list of the packet, and the segment list includes a segment identifier of a network node on the forwarding path of the packet. The configuration policy is used to indicate a configuration of a related field in the segment identifier of the network node on the forwarding path, for example, a configuration of the value of the first field. Details are described below.

The following uses an example in which the segment routing policy is generated by the ingress node (the first network node), and the first network node is the network node 101 in FIG. 4A. It is assumed that the first network node needs to forward the packet from the network node 101 to the network node 106. As shown in FIG. 4A, there are two paths from the network node 101 to the network node 106. The network nodes on the first path include the network node 102, the network node 103, and the network node 106. The network nodes on the second path include the network node 104, the network node 105, and the network node 106. The network node 101 selects the optimal first path from the two paths based on a service requirement (for example, a shortest path and a lightest load) for forwarding the packet, to obtain a segment routing policy used to indicate a packet routing (forwarding) path. Herein, the segment routing policy may be specifically the routing policy in the segment routing policy. The segment routing policy includes at least a correspondence between a destination address of the packet (an address D:: of the network node 106) and the segment list. In this way, the first network node can add, to a to-be-sent packet based on the correspondence in the segment routing policy, the segment list corresponding to the destination address of the packet. The segment list includes the segment identifiers of the network nodes on the forwarding path of the packet. The segment identifiers in the segment list may be arranged in descending order of distances from the network nodes through which the packet passes on the first path, and the segment list may be specifically <SID 6, SID 3, SID 2>. Optionally, the segment list may also include the segment identifier of the network node 101. For example, the segment list may be <SID 6, SID 3, SID 2, SID 1>. When the segment list includes the segment identifier of the network node 101, the segment identifier of the network node 101 is not used to forward the packet, and may be used to carry information, for example, a network performance parameter of the network node 101. Details are described below by using an example.

Optionally, the first network node may further obtain, based on an actual service requirement of the packet, a segment routing policy used to configure the packet. Herein, the segment routing policy may be specifically the configuration policy in the segment routing policy. The segment routing policy is specifically used to indicate or configure a value of a related field of a segment identifier of a network node in the segment list of the packet, to meet the actual service requirement of the packet. For example, in a latency-sensitive service or a low-latency service, the segment routing policy is used to indicate that the value of the first field in the segment identifier of the network node in the segment list may be 0 to 3.0 to 3 indicate the network slice identifier 0 to the network slice identifier 3. In other words, in the low-latency service, any one of the network slices 0 to 3 can be used during packet transmission, to meet a low-latency requirement of the service. In a conventional service (a service with a low latency requirement), the segment routing policy is used to indicate that the value of the first field in the segment identifier of the network node in the segment list is 4 to 6, and the like. In other words, in the conventional service, the packet may be transmitted by using any one of the network slices 4 to 6.

For another example, in a latency measurement scenario, the segment routing policy may be used to indicate that the value of the first field of the segment identifier of the network node in the segment list of the packet is 1, which indicates that the network performance parameter type is a time type. In this way, the network node can add, to the packet, a sending time point at which the packet is sent, so that a transmission latency of the packet can be subsequently calculated. For example, when receiving the packet, the another network node may obtain the transmission latency of the packet through calculation based on a receiving time point of the packet and the sending time point carried in the packet.

After obtaining the segment identifier of each network node on the network in the S501, the first network node may obtain, according to the segment routing policy, a second packet including the segment list. The segment list includes the segment identifier of the network node on the packet forwarding path, the segment identifier of the network node includes the value of the first field, and the value of the first field is determined according to the segment routing policy. The second packet in this application may be specifically a data packet.

Specifically, the first network node may add, to the second packet based on the correspondence between the destination address of the packet and the segment list in the segment routing policy, a segment list corresponding to a destination address of the second packet. For example, if the destination address of the second packet is D::, a segment list corresponding to the destination address D:: may be <SID 6, SID 3, SID 2, SID 1>. In addition, the first network node may further reconfigure (or determine) the value of the related field in the segment identifier of each network node in the segment list according to the segment routing policy, for example, determine the value of the first field in the segment identifier of each network node. In this way, the first network node adds the determined value of the first field to the second packet, and sends the second packet to another network node.

In this application, the values of the first fields in the segment identifiers of the network nodes in the segment list may be the same or may be different. In an actual application, in a same service scenario, the values of the first fields in the segment identifiers of the network nodes in the segment list are usually the same. For example, in the latency measurement scenario, the value that is of the first field of the segment identifier of each network node and that is indicated by the segment routing policy is 1, and this indicates that the network performance parameter type is the time type, to indicate the network node to add, to the packet, a time point at which the network node sends the packet, to calculate the transmission latency of the packet.

In this application, an example in which the first network node determines the value of the first field in the segment identifier of the second network node according to the segment routing policy is used to describe two example implementations in the S502.

In an example, in the step S500 and the step S501, the value of the first field in the segment identifier of the second network node is advertised as the specific value. The specific value may be specifically the default value defined by the system, or may be a single value of the first field that is different from the default value. Specifically, the format of the segment identifier of the second network node that is advertised in the S500 does not describe the value of the first field, or the format describes that the value of the first field is the default value or the single specific value other than the default value. In addition, the value of the first field included in the segment identifier of the second network node that is advertised in the S501 is also the specific value. In this case, the first network node may modify the value of the first field according to the segment routing policy, and add a modified value to the second packet sent to the second network node. Specifically, the first network node adds the modified value to the first field of the segment identifier of the second network node in the second packet. In this way, the first network node may directly determine the value of the first field according to the segment routing policy, and then process the second packet simply and conveniently based on the value of the first field, to conveniently process the packet.

For example, in the network slicing scenario, the first field is the network slice field (sliceID), the value of the first field is used to indicate a network slice identifier, and the network slice identifier is used to identify a network slice used during packet transmission. Correspondingly, the first network node may modify the value of the first field based on the network slice identifier that meets the current service requirement and that is indicated by the segment routing policy, to add the network slice identifier to the first field. For example, in a low-latency service scenario, the segment routing policy is used to indicate that a data packet in the low-latency service scenario needs to be transmitted in any one of the network slices 1 to 3, to meet a low-latency requirement. In this case, the first network node selects any network slice (for example, the network slice 3) from the three network slices indicated by the segment routing policy, and then modifies the value of the first field to 3, to indicate that the packet is transmitted in the network slice 3.

In the network performance measurement scenario, the first field is a flag field, and the value of the flag field is used to indicate the network performance parameter type. Correspondingly, the first network node modifies the value of the flag field based on the network performance parameter type that meets the current service requirement and that is indicated by the segment routing policy, to add the network performance parameter type to the flag field. For example, in a scenario in which a transmission latency of a packet is calculated, the segment routing policy is used to indicate that the network performance parameter type is the time type (or directly indicate that the value of the first field is 1). In this case, the first network node sets the value of the first field in the segment identifier of the network node in the packet to 1 according to the segment routing policy, to add, to the packet, a time point at which the first network node sends the packet, so that the network node subsequently can calculate the transmission latency of the packet.

In an example, there are a plurality of values of the first field in the segment identifier of the second network node that are advertised in the step S500 and/or the step S501. Specifically, the format of the segment identifier of the second network node that is advertised in the S500 describes the plurality of values of the first field, and/or the plurality of segment identifiers of the second network node that are advertised in the S501 include the values of the first field, and the values of the first field are not the specific value. In other words, there are the plurality of values of the first field, and the plurality of values of the first field may be advertised by using the format of the segment identifier of the second network node and/or the plurality of segment identifiers of the second network node. In this case, the first network node may select, according to the segment routing policy, one value that matches the segment routing policy from the plurality of values of the first field, use the selected value as the value of the first field that is determined by the first network node, and add the determined value of the first field to the second packet, specifically, add the determined value of the first field to the first field of the segment identifier of the second network node in the second packet, or add the determined value of the first field to another field (for example, a TLV field) in the second packet. In this way, the second network node may advertise, in advance by using the segment identifier of the second network node or the format of the segment identifier of the second network node, the plurality of values of the first field that are supported by the second network node. Correspondingly, the first network node may learn, in advance, the plurality of values of the first field that are supported by the second network node, and then select, according to the segment routing policy, one matched value from the plurality of values of the first field to process the second packet, to improve packet processing flexibility.

Optionally, when the plurality of values of the first field are advertised by using the plurality of segment identifiers of the second network node, the segment identifier of each second network node includes one value of the first field. Correspondingly, the first network node may determine, from the plurality of segment identifiers of the second network node according to the segment routing policy, one segment identifier of the second network node that matches the segment routing policy (in other words, determine a value of a first field that is included in the segment identifier of the second network node), add the determined segment identifier of the second network node to the second packet, and send the second packet to the second network node.

For example, in the network slicing scenario, it is assumed that the second network node advertises, to the first network node, that the value of the first field that is in the segment identifier of the second network node may be 3 to 5, in other words, the network slice identifier that is used for packet transmission and that is supported by the second network node may be 3 to 5. Correspondingly, the segment routing policy obtained by the first network node indicates that the network slice identifiers that meet the current service requirement are 1 to 3. In this case, the first network node may determine, from the plurality of advertised values of the first field according to the segment routing policy, a value (herein, the network slice identifier is 3) that matches the segment routing policy, and use the value as the determined value of the first field.

Step S503: The first network node sends the second packet to the second network node, where the second packet carries the determined value of the first field in the segment identifier of the second network node. Correspondingly, the second network node receives the second packet.

Step S504: The second network node processes the second packet based on the value of the first field.

In this application, the first network node may obtain the second packet according to the segment routing policy. The second packet includes the segment identifier of the second network node, and the segment identifier of the second network node includes the determined value of the first field. Then, the first network node obtains the segment identifier SID 2 of the second network node from the segment list of the second packet, modifies the destination address of the second packet to the SID 2, and sends the second packet to the second network node, so that the second network node processes the second packet based on the value of the first field. Optionally, the second network node may be a next-hop node that is on the packet forwarding path and that is closest to the first network node in a forwarding direction.

The following specifically describes several example implementations related to the S504.

In an example, in the network slicing scenario, the first field is the network slice field, and the value of the network slice field indicates the network slice identifier. Correspondingly, after receiving the second packet, the second network node determines whether the destination address of the second packet matches the segment identifier of the second network node. Specifically, the second network node determines whether a value of a destination address field in the second packet is the same as the value of the segment identifier of the second network node. If the value of the destination address field in the second packet is the same as the value of the segment identifier of the second network node, the second network node determines that the destination address of the second packet matches the segment identifier of the second network node. Further, the second network node learns, by parsing the value of the network slice field that is in the segment identifier of the second network node in the second packet, a network slice identifier corresponding to the value. Correspondingly, the second network node may forward the second packet based on a network service provided by a network slice corresponding to the network slice identifier. The network service includes but is not limited to a metric service such as a latency, a throughput, and a bandwidth. For example, the second network node forwards the second packet based on a maximum bandwidth or a maximum transmission rate provided by the network slice.

In an example, in the network performance measurement scenario, the first field is the flag field, and the value of the flag field indicates the network performance parameter type. Correspondingly, after receiving the second packet, the second network node determines whether the destination address of the second packet matches the segment identifier of the second network node. If the destination address of the second packet matches the segment identifier of the second network node, the second network node may learn, by parsing the value of the flag field that is in the segment identifier of the second network node in the second packet, the network performance parameter type corresponding to the value. Further, the second network node may add a network performance parameter corresponding to the network performance parameter type of the second network node to the second packet, and send, to another network node, the second packet to which the network performance parameter is added, so that the another network node performs corresponding network performance calculation based on the network performance parameter.

The network performance parameter type may include any one of the following: a time type, a type of a quantity of sent packets, a queue occupation type, and an interface type. The network performance parameter corresponds to the network performance parameter type, and may include any one of the following: a time point at which the second network node sends the second packet, and a quantity of service packets received by the second network node before sending the second packet, where the service packet and the second packet belong to a same data flow, in other words, packets are sent by using a same segment list or a same packet forwarding path, a queue occupation rate of a packet sending queue of the second network node, where the packet sending queue may be a queue that stores the second packet, and a communications interface that is used by the second network node to transmit the second packet, where the communications interface may include a sending interface for sending the second packet or a receiving interface for receiving the second packet.

The following describes a related embodiment in which the second network node adds the network performance parameter to the second packet. When the second network node supports the SRv6 function, for example, when the second network node on the SRv6 network supports the SRv6 function, the second network node may add, to the second packet, the network performance parameter that is of the second network node and that corresponds to the network performance parameter type. Specifically, the network performance parameter may be added to the segment identifier of the second network node in the second packet. For example, the network performance parameter is added to a function field of the segment identifier of the second network node, or is added to the entire segment identifier of the second network node. Optionally, the network performance parameter may also be added to a segment identifier of a third network node in the second packet, and the third network node is a next-hop node that is closest to the second network node on the packet forwarding path, in other words, the third network node is a next-hop node of the second network node on the packet forwarding path. Optionally, the network performance parameter may be further added to another field in the second packet, for example, the TLV field. This is not limited in this embodiment of this application.

For example, the second network node is the network node 102 in FIG. 4A, and the network node 102 supports the SRv6 function. In this case, after receiving the second packet that carries the value of the flag field, the second network node may obtain, based on a network performance parameter type indicated by the value of the flag field, the network performance parameter that is of the second network node and that corresponds to the type, then add the network performance parameter of the second network node to the function field of the segment identifier of the second network node, and send, to the network node 103, the second packet to which the network performance parameter is added.

When the second network node does not support the SRv6 function, for example, when the second network node on an IPv6 network does not support the SRv6 function, because an existing processing procedure of the second network node based on the IPv6 network has been modified, the second network node may detect the value of the first field (the value of the flag field), to determine the network performance parameter type correspondingly indicated by the value, and add, to the second packet, the network performance parameter that is of the second network node and that corresponds to the network performance parameter type. Specifically, the second network node may add the network performance parameter to the another field in the second packet. The another field is a field other than the segment identifier of the second network node, for example, the TLV field.

That the second network node is the network node 109 in FIG. 4B is used as an example. The network node 109 does not support the SRv6 function. After receiving the second packet that carries the value of the flag field, the second network node may obtain, based on the network performance parameter type indicated by the value of the flag field, the network performance parameter that is of the second network node and that corresponds to the type, then add the network performance parameter to the TLV field in the second packet, and send, to the network node 106, the second packet to which the network performance parameter is added, so that the network node 106 can perform corresponding network performance calculation. For example, if the network performance parameter type is the time type, the network performance parameter may be a first time point at which the network node 109 sends the second packet. Correspondingly, after receiving the second packet, the network node 106 may calculate a difference between a second time point and the first time point based on the second time point at which the second packet is received, and use the difference as a latency of transmitting the second packet between the network node 109 and the network node 106.

By implementing the embodiment of this application, a prior-art problem that a programming capability of the network node is low because the format of the segment identifier of the network node cannot be explicitly advertised can be resolved. This improves the programming capability of the network node.

The following uses two specific examples to describe in detail related embodiments in this application.

Embodiment 1: Network Slicing Scenario

Figure 6A:
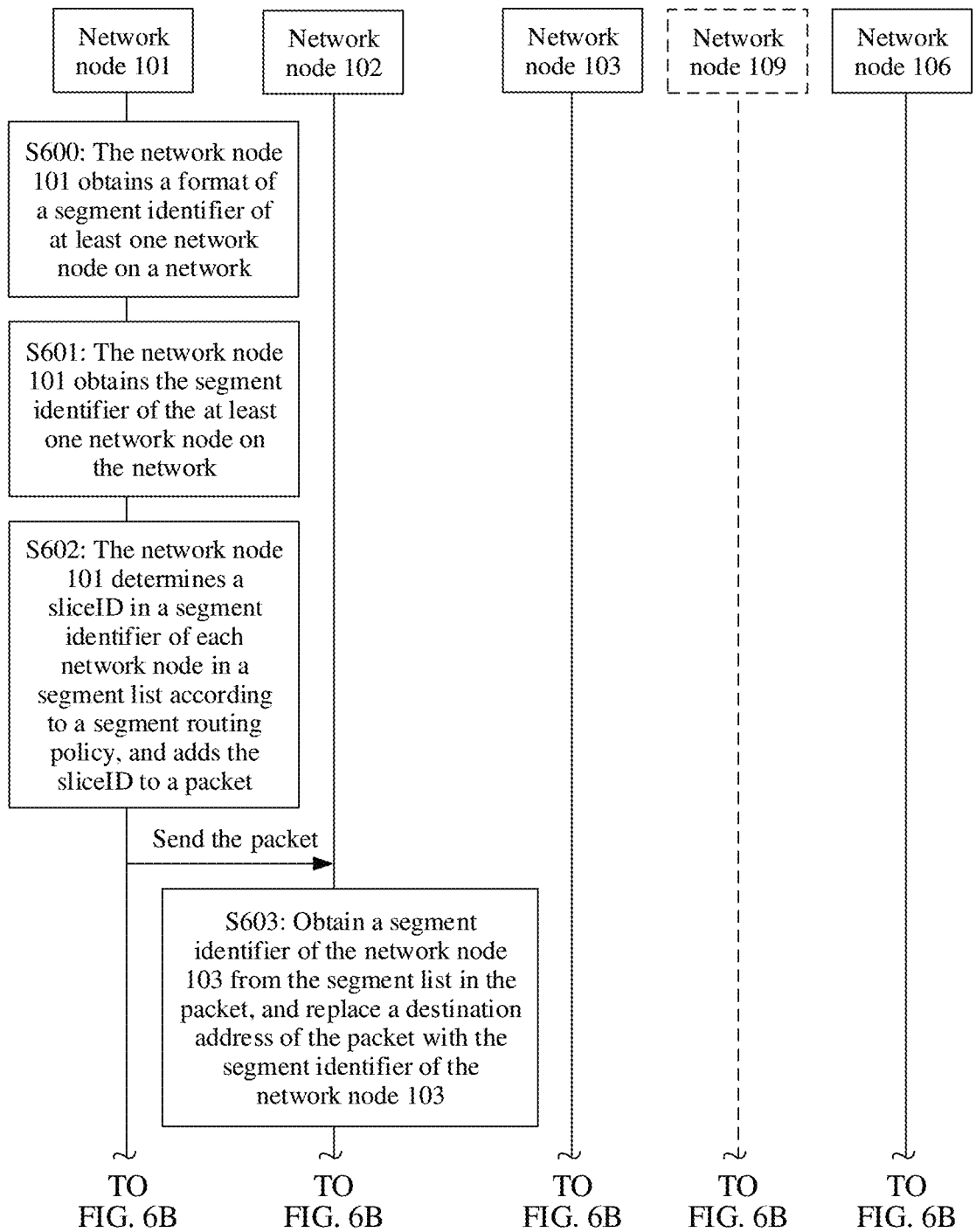
FIG. 6A and FIG. 6B are a schematic flowchart of another packet processing method according to an embodiment of the present invention.
Figure 6B:
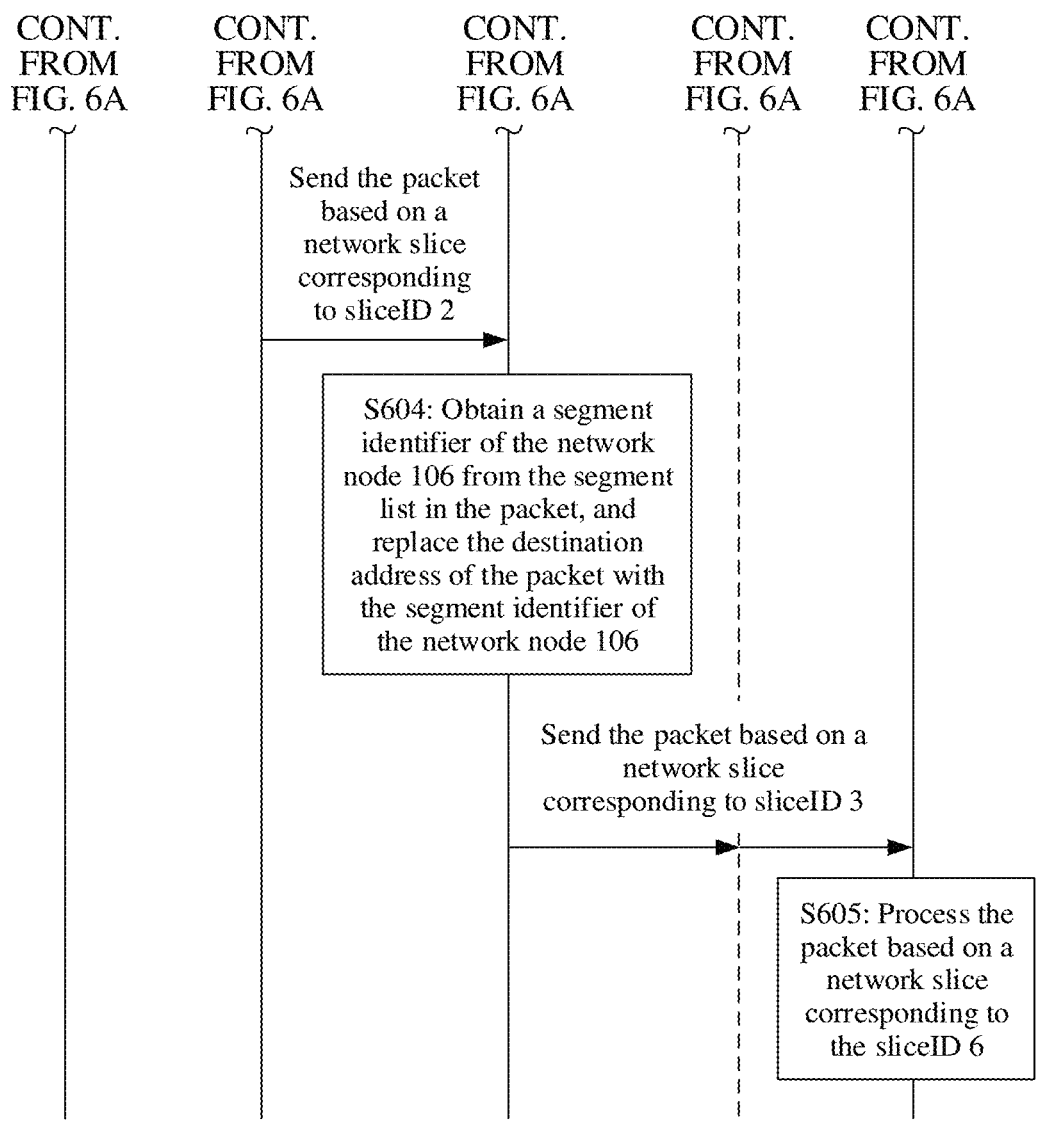

FIG. 6A and FIG. 6B are a schematic flowchart of another packet transmission method according to an embodiment of the present invention. The schematic flowchart includes the following implementation steps:

Step S600: A network node 101 obtains a format of a segment identifier of at least one network node on a network, where the format of the segment identifier of the network node is used to describe information such as a location, a length, and a value of each field included in the segment identifier of the network node. The format of the segment identifier of the network node describes a locator field, a function field, and a network slice field included in the segment identifier of the network node.

In the network framework shown in FIG. 4A or FIG. 4B, each of the network nodes supporting the SRv6 function on the network may advertise a format of a segment identifier of the network node to another network node on the network. Correspondingly, each network node may receive a format of a segment identifier of the another node that is advertised by the another node on the network. For example, as shown in FIG. 4A or FIG. 4B, the network node 101 may receive a format of a segment identifier of each of the network node 102 to the network node 106. In a same network slicing scenario, each network node has the same format of the segment identifier, and the format of the segment identifier describes the locator field, the function field, and the network slice field included in the segment identifier of the network node. Optionally, the format of the segment identifier of the network node may further describe a value (sliceID) supported by the network slice field. Specifically, when the sliceID is 0, it may indicate t a default value, which may be referred to as a default value. When the sliceID is not 0, it indicates a network slice identifier supported by the network node. Correspondingly, in an actual communication process of the network node, the network node may select one network slice identifier from one or more supported network slice identifiers, to perform communication by using a network slice corresponding to the network slice identifier.

Optionally, each network node on the network may support one or more sliceIDs, and the sliceIDs may be the same or may be different. This is not limited in this embodiment of this application.

Step S601: The network node 101 obtains the segment identifier of the at least one network node on the network. The segment identifier of the network node includes a value of the network slice field.

It may be understood that the network node supporting the SRv6 function on the network may send the format of the segment identifier of the network node to the another node on the network, to notify the another node of information such as a location and a length of each field in the segment identifier of the network node. Further, the network node supporting the SRv6 function on the network may further send the segment identifier supported by the network node to the another node on the network. In this case, the segment identifier of the network node carries a value of each field, to indicate/notify corresponding information. For example, the value of the locator field is used to indicate a next-hop routing address of the packet. When there are a plurality of values of a field in the segment identifier, a plurality of segment identifiers of the network node may be used to publish the plurality of values supported by the field.

For example, when the network node 102 supports a plurality of values of the network slice field, the network node 102 may send a plurality of segment identifiers of the network node 102 to the network node 101. One segment identifier includes one value of the network slice field. In this way, the plurality of values of the network slice field may be advertised to the network node 101.

For specific descriptions of the step Shoo and the step S601, refer to the related descriptions in the step S500 and the step S501. Details are not described herein again.

Step S602: The network node 101 determines, according to a segment routing policy, a value (sliceID) of the network slice field in the segment identifier of the network node included in a segment list of the packet, and adds the determined sliceID to the packet. The packet includes an IPv6 packet header, an SRH, and a payload. As a schematic table of a packet format in FIG. 7A, for example, the IPv6 packet header shows only a destination address (DA), and the SRH shows only a segment list. The network node 101 replaces the destination address of the packet with an SID 2, and sends the packet to the network node 102.

Specifically, the network node 101 may determine the segment list of the packet according to the segment routing policy, and add the determined segment list to a to-be-forwarded packet, where the packet is specifically a data packet. The segment list is used to indicate a forwarding path of the packet, and specifically includes a segment identifier SID of a network node on the packet forwarding path, where the SID includes a sliceID determined according to the segment routing policy. For details about how to determine the segment list of the packet and the value of the network slice field of the network node in the segment list according to the segment routing policy, refer to related descriptions in the step S502 in FIG. 5. Details are not described herein again.

In an example, the network node 101 receives a format of a segment identifier of a network node. The format does not describe a value of a network slice field in the segment identifier of the network node, or the format describes that the value of the network slice field in the segment identifier of the network node is a specific value. In addition, the network node 101 receives the segment identifier of the network node. A value of a network slice field included in the segment identifier of the network node is also the specific value, and the specific value may be specifically a system-defined default value (for example, 0), or may be a value of the network slice field (for example, a network slice identifier 1) that is different from the default value. In this case, the network node 101 may determine, according to the segment routing policy, the segment identifier SID of the network node included in the segment list of the packet. The segment list includes segment identifiers of all network nodes on the packet forwarding path. Then, the network node 101 may further determine a sliceID in the segment identifier of the network node in the segment list according to the segment routing policy, and modify the value of the network slice field in the segment identifier SID of the network node based on the determined sliceID, and add the determined sliceID to the network slice field of the SID, in other words, add the determined sliceID to a to-be-forwarded packet. The packet in this embodiment of this application may be specifically a data packet. For details about how to determine the value of the network slice field in the segment identifier of the network node in the segment list according to the segment routing policy, refer to related descriptions of the step S502 in FIG. 5. Details are not described herein again.

In an example, the network node 101 receives a format of a segment identifier of a network node. The format describes a plurality of values supported by the network slice field in the segment identifier of the network node. Optionally, in this case, no limitation is imposed on the segment identifier of the network node. For example, the value of the network slice field that is included in the segment identifier of the network node and that is advertised by the network node to the network node 101 may be the default value, or may be the specific value different from the default value. Alternatively, when there are the plurality of values of the network slice field that are supported by the network node, the network node may advertise the plurality of segment identifiers of the network node to the network node 101. A segment identifier of each network node includes one value of the network slice field, in other words, the plurality of values of the network slice field are advertised. In this case, the network node 101 may select, from the plurality of values (sliceID) of the network slice field of the network node according to the segment routing policy, a sliceID of the network node that matches the segment routing policy and that is on the packet forwarding path, and add the selected sliceID to the network slice field of the segment identifier of the network node in the segment list, to add the selected sliceID to the packet.

In an example, the network node 101 receives the plurality of segment identifiers of the network node. One segment identifier of the network node includes one value (sliceID) of the network slice field, in other words, the network node 101 receives the plurality of values of the network slice field that are supported by the network node. Optionally, in this case, the format of the segment identifier of the network node is not limited. For example, the format of the segment identifier of the network node that is advertised by the network node to the network node 101 may not describe the value of the network slice field that is in the segment identifier of the network node, or may describe one or more values that are supported by the network slice field and that are in the segment identifier of the network node. In this case, the network node 101 may select, from the plurality of SIDs (namely, a plurality of sliceIDs) of each network node according to the segment routing policy, the SID of the network node (namely, the sliceID of the network node) that matches the segment routing policy and that is on the packet forwarding path, construct the segment list of the packet based on the selected SID of the network node, and add the segment list to the packet, to guide packet forwarding.

Figure 7A:
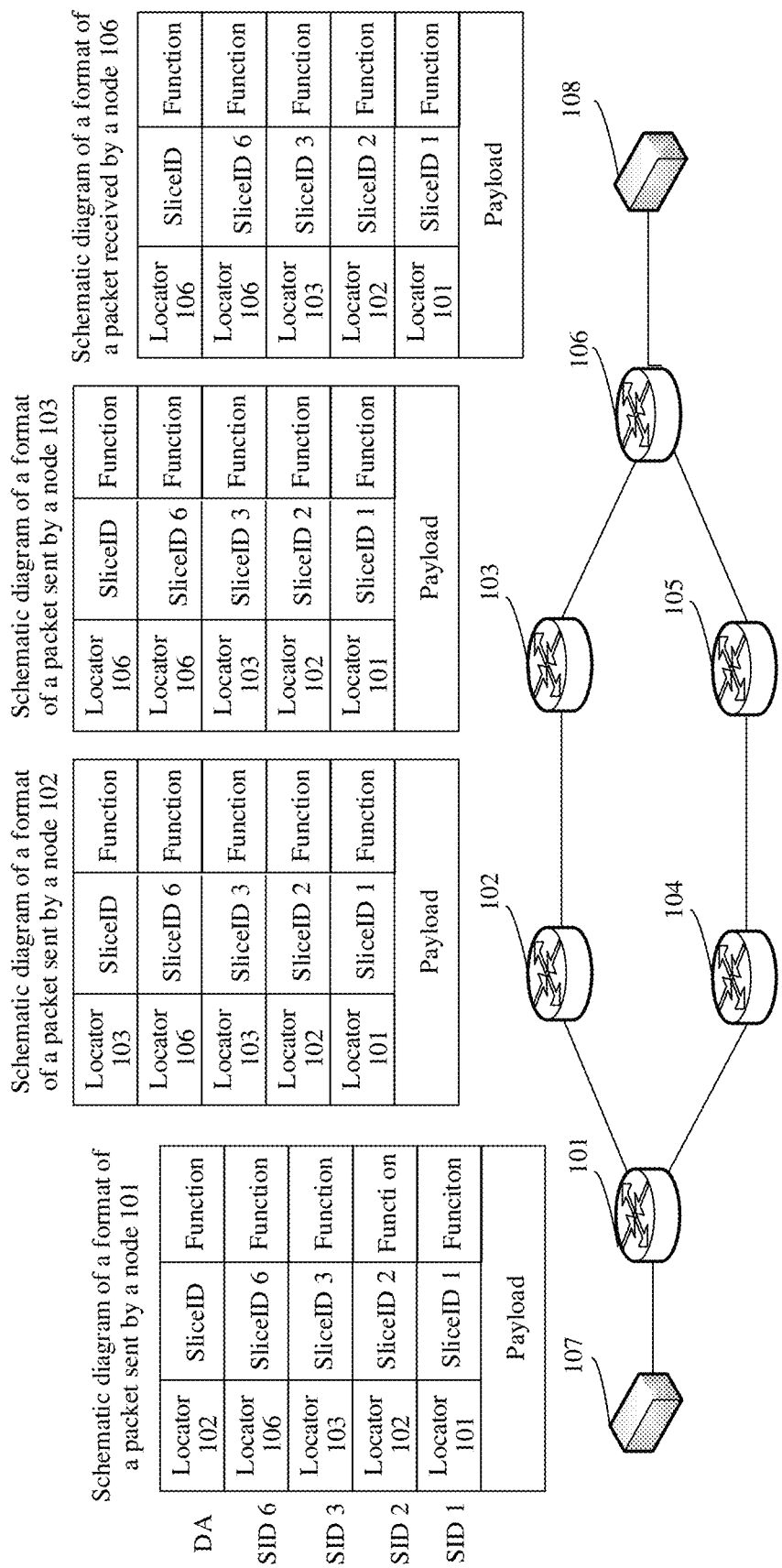
FIG. 7A to FIG. 7C are schematic diagrams of three packet transmission scenarios according to an embodiment of the present invention.

In this example, the segment list may be <SID 6, SID 3, SID 2>. Alternatively, the segment list may further include the segment identifier of the network node 101, which may be specifically <SID 6, SID 3, SID 2, SID 1>. As shown in FIG. 7A, the sliceIDs that are in the SIDs of each network node and that are determined by the network node 101 according to the segment routing policy are a sliceID 6, a sliceID 3, a sliceID 2, and a sliceID 1. Any two of the sliceIDs may be the same or may be different. This is not limited in this embodiment of this application. In an actual application, each network node in the segment list in a same service scenario usually has the same sliceIDs in the segment identifier.

Correspondingly, after adding the determined sliceID to the packet, the network node 101 may process the packet based on the segment list in the packet. Specifically, when the segment list included in the SRH is <SID 6, SID 3, SID 2, SID 1>, the network node 101 modifies the destination address of the packet to the SID 2, and may further forward the packet to the second network node based on a network service provided by a network slice corresponding to the sliceID 1 in the SID 1. The network service includes but is not limited to a transmission bandwidth, a transmission rate, a network throughput rate, a network throughput, and the like. For example, as shown in FIG. 7A, the segment list includes the segment identifier SID 1 of the network node 101. After modifying the destination address of the packet to the SID 2, the network node 101 may forward the packet to the network node 102 based on the network service provided by the corresponding sliceID 1 in the SID 1.

Figure 7B:
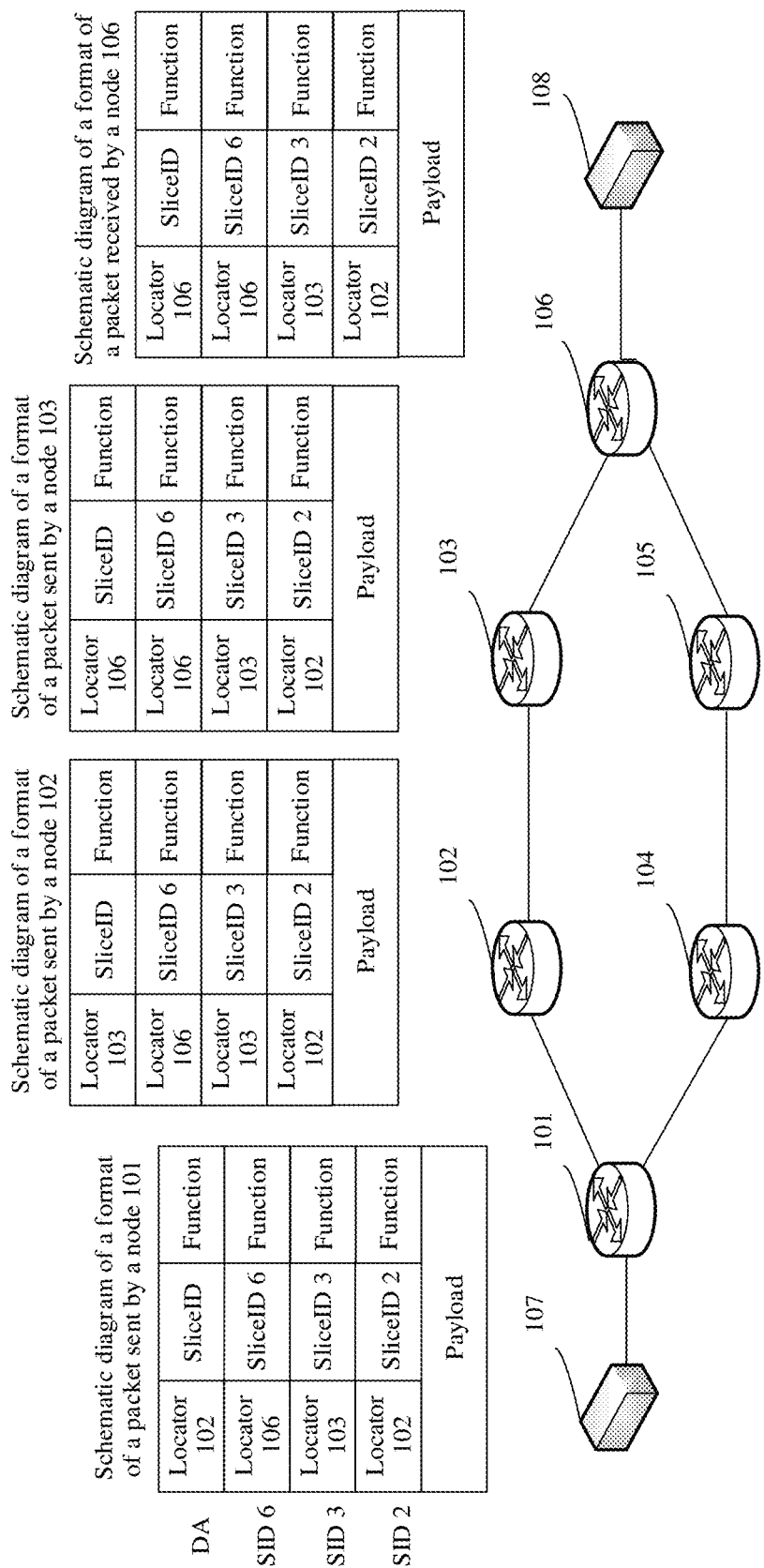

When the segment list included in the SRH is <SID 6, SID 3, SID 2>, the network node 101 modifies the destination address of the packet to the SID 2, and optionally, may further forward the packet to the second network node in a default manner, for example, forward the packet by using a default network slice. For example, as shown in FIG. 7B, the segment list does not include the network node SID 1 of the network node 101. After the network node 101 modifies the destination address of the packet to the SID 2, because the segment list of the packet does not include the SID 1 of the network node 101 (in other words, there is no network service indicated by the network slice identifier sliceID 1 in the SID 1), the network node 101 may forward the packet to the network node 102 by using a network service provided by the default network slice. S60: The network node 102 receives the packet, and when determining that the value of the destination address field of the packet matches the segment identifier of the network node 102, the network node 102 obtains the SID 3 from the segment list in the packet, and replaces the destination address of the packet with the SID 3. The network node 102 sends the packet to the network node 103 based on a network slice corresponding to the sliceID 2 in the SID 2. Specifically, the network node 102 may send the packet to the network node 103 based on the network service (for example, an indicator service such as a transmission rate or a transmission bandwidth) provided by the network slice.

The network node 102 may determine whether the value of the destination address field of the packet is the same as the value of the segment identifier of the network node 102. If the value of the destination address field of the packet is the same as the value of the segment identifier of the network node 102, the network node 102 may determine that the value of the destination address field of the packet matches the segment identifier of the network node 102. If the value of the destination address field of the packet is not the same as the value of the segment identifier of the network node 102, the network node 102 may determine that the value of the destination field of the packet does not match the segment identifier of the network node 102.

S604: The network node 103 receives the packet, and when determining that the value of the destination address field of the packet matches the segment identifier of the network node 103, the network node 103 obtains the SID 6 from the segment list in the packet, and replaces the destination address of the packet with the SID 6. The network node 103 sends the packet to the network node 106 based on a network slice corresponding to the sliceID 3 in the SID 3. Specifically, the network node 103 may send the packet to the network node 106 based on a network service (for example, an indicator service such as the transmission rate or the transmission bandwidth) provided by the network slice corresponding to the sliceID 3.

Figure 7C:
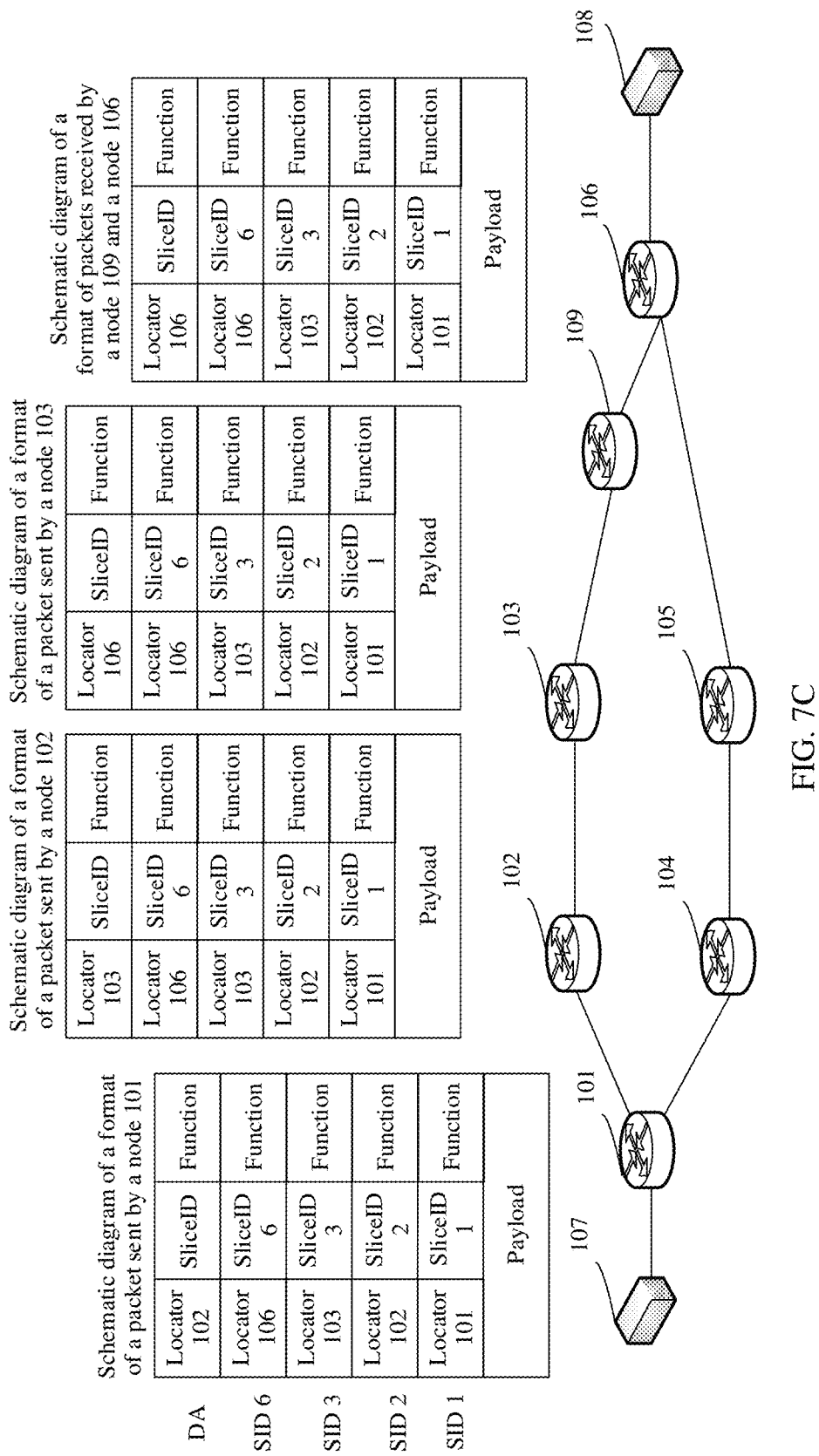

In an example, in the network framework shown in FIG. 4B, the network node 109 that does not support the SRv6 function still exists between the network node 103 and the network node 106. In an actual communication process, after replacing the destination address of the packet with the SID 6, the network node 103 may first send the packet to the network node 109 based on the network slice corresponding to the sliceID 3 in the SID 3. Because the network node 109 does not support the SRv6 function, as shown in FIG. 7C, after receiving the packet, the network node 109 may forward the packet to the network node 106 based on the destination address SID 6 (an IPv6 address of the network node 106) of the packet. How the network node 109 sends the packet to the network node 106 is not limited in this embodiment of this application. For example, the network node 109 forwards the packet to the network node 106 by using the network service such as the transmission rate or the transmission bandwidth provided by the default network slice.

S605: The network node 106 receives the packet, and when determining that the value of the destination address field of the packet matches the SID 6, processes the packet based on a network slice corresponding to the sliceID 6 in the SID 6.

Specifically, after receiving the packet, the network node 106 may process the packet based on a network service provided by the network slice corresponding to the sliceID 6 in the segment identifier SID 6 of the network node 106, for example, forward the packet, or store the packet. This is not limited in this embodiment of this application.

By implementing the foregoing embodiment, the segment identifier of the network node is explicitly advertised by using the format of the segment identifier of the network node, so that the network node can modify the value of the related field in the segment identifier of the network node based on the actual service requirement, to carry corresponding information, and to improve a programming capability of the network node.

Embodiment 2: Network Performance Measurement Scenario

Figure 8A:
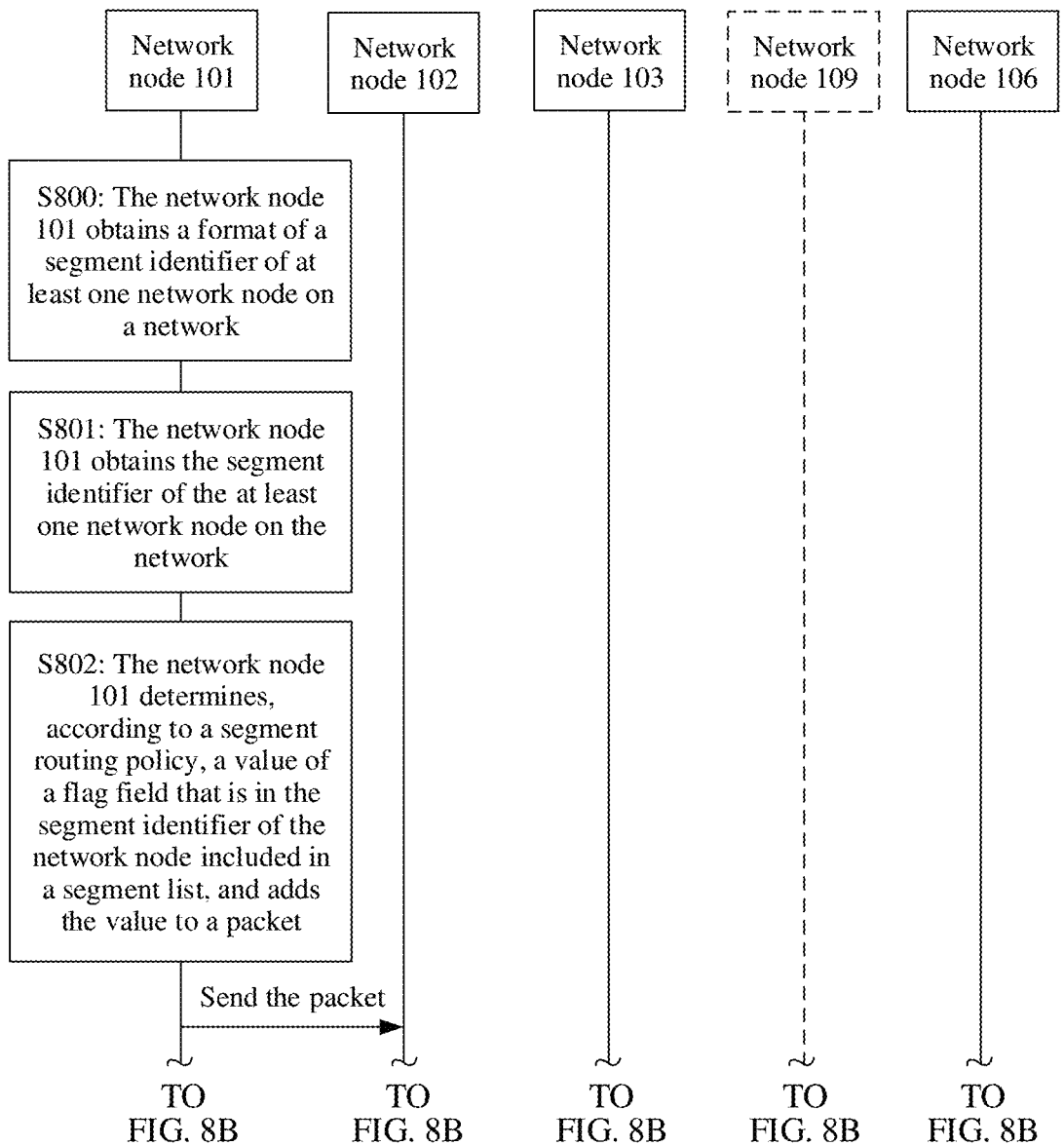
FIG. 8A and FIG. 8B are a schematic flowchart of another packet processing method according to an embodiment of the present invention.
Figure 8B:
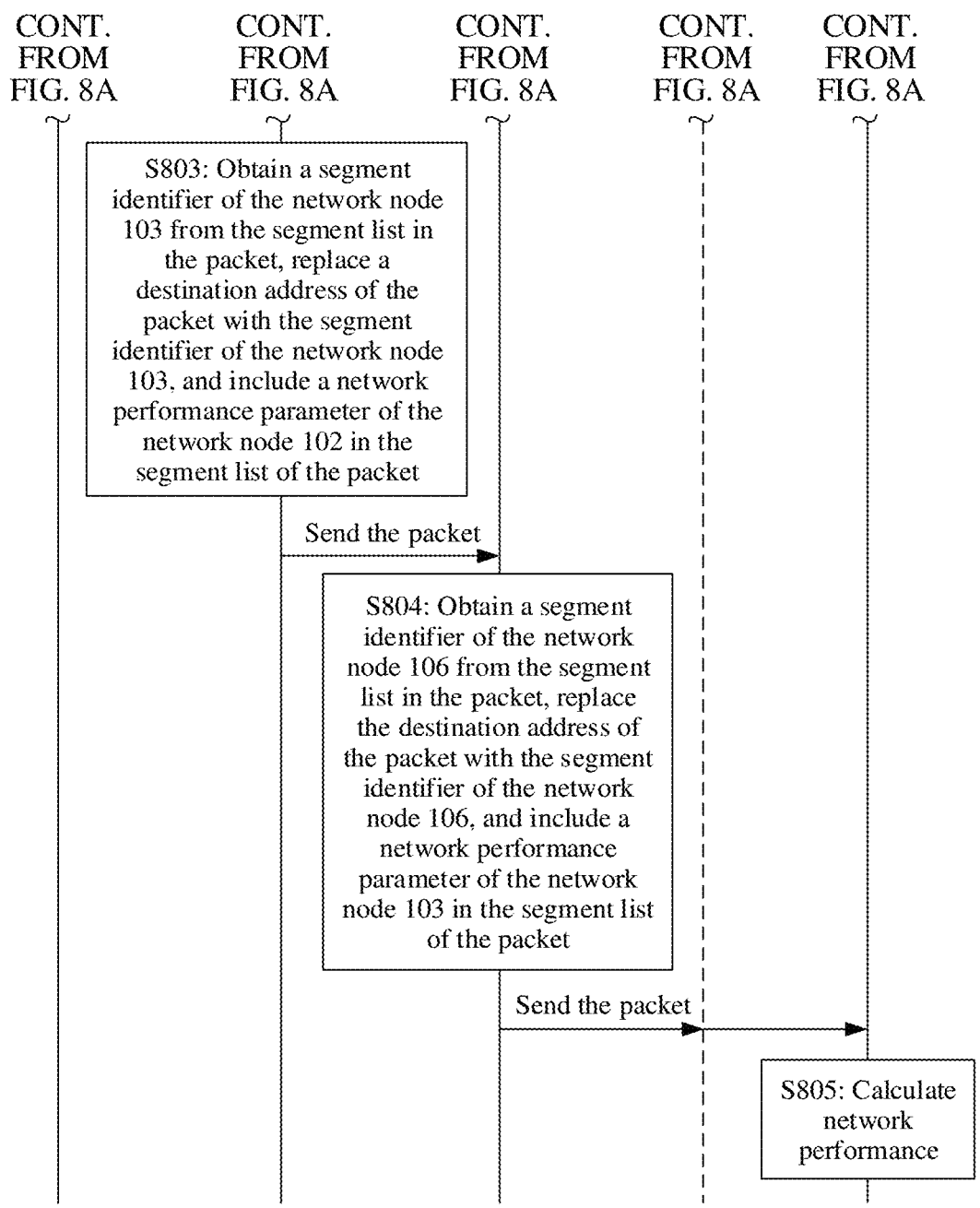

FIG. 8A and FIG. 8B are a schematic flowchart of another packet processing method according to an embodiment of the present invention. The method shown in FIG. 8A and FIG. 8B includes the following implementation steps.

S800: A network node 101 obtains a format of a segment identifier of at least one network node on a network, where the format of the segment identifier of the network node describes a locator field, a function field, and a flag field included in the segment identifier of the network node.

In this embodiment of this application, the format of the segment identifier of the network node is used to describe information, such as a location, a length, and a value of each field, that is included in the segment identifier of the network node. Formats of segment identifiers of different network nodes may be the same or may be different. In an actual application, in a same service scenario, for example, in the network performance measurement scenario, formats of segment identifiers of all network nodes on the network are generally the same, which describes the locator field, the function field, and the flag field that are included in the segment identifier of the network node.

Optionally, the format of the segment identifier of the network node further describes a value of each field, for example, a value (flag) of the flag field, where the value of the flag field is used to indicate a network performance parameter type. Specifically, when the flag is 0, it indicates that the flag is a default value, or which may be referred to as a default value, indicating that network performance does not need to be measured. When the flag is not 0, it indicates the network performance parameter type. There are a plurality of values (flag) of the flag field to identify different network performance parameter types. For example, in the foregoing embodiment, when the flag is 1, it indicates that the network performance parameter type is a time type, and the network node may be indicated to add, to a packet, a time point at which the packet is sent, to facilitate calculation of a packet transmission latency.

Step S801: The network node 101 obtains the segment identifier of the at least one network node on the network, where the segment identifier of the network node includes the value of each field, for example, a value of the locator field, a value of the first field, and a value of the function field.

A network node supporting the SRv6 function on the network may further send a segment identifier supported by the network node to another node on the network. The segment identifier of the network node includes the value of each field, and is used to indicate or notify corresponding information. For example, the value of the locator field may be used to indicate a next-hop routing address of the packet, and the value of the function field may be used to indicate the network node to execute a function corresponding to the value. When a field in the segment identifier has a plurality of values, the plurality of values supported by the field may be published by using a plurality of segment identifiers of the network node, and a segment identifier of each network node includes one value of the field.

In an actual application, for example, the first field has a plurality of values. In the network performance measurement scenario, the plurality of values supported by the first field are usually published in the format of the segment identifier of the network node. To save traffic, when the segment identifier of the network node is advertised, a segment identifier of the network node that carries the value of the first field with the specific value is usually advertised. Optionally, the network node may further advertise the value of the first field in the segment identifier of the network node, and the like. This is not limited in this embodiment of this application.

For specific descriptions of the step S800 and the step S801, refer to the related descriptions in the step S500 and the step S501. Details are not described herein again.

Step S802: The network node 101 determines, according to a segment routing policy, the value of the flag field in the segment identifier of the network node included in the segment list of the packet, and adds the value of the flag field to the packet. The packet includes an IPv6 packet header, an SRH, and a payload. As a schematic table of a packet format in FIG. 9A, for example, the IPv6 packet header shows only a destination address (DA), and the SRH shows only a segment list. The network node 101 replaces the destination address of the packet with an SID 2, adds network performance parameters (NPP) of the network node 101 to the packet, and sends the packet to a network node 102.

Specifically, the segment routing policy is pre-generated by an ingress node (the network node 101) or a controller, and is used to indicate configuration and routing of the packet. After obtaining the segment routing policy, the network node 101 may determine, according to the segment routing policy, the segment identifier SID of the network node that is included in the segment list of the packet, where the SID includes the value (flag) of the flag field determined according to the segment routing policy, and add the determined value of the flag field to the packet. For details about how to determine the segment list of the packet and the value of the flag field of the network node in the segment list according to the segment routing policy, refer to related descriptions in the step S502 in FIG. 5. Details are not described herein again.

In an example, the network node 101 receives the format of the segment identifier of the network node. The format does not describe the value of the flag field in the segment identifier of the network node, or describes that the value of the flag field is the specific value. In addition, the network node 101 receives the segment identifier of the network node, where the value of the flag field included in the segment identifier is the specific value. The specific value may be specifically a default value that is set by a system in a self-defined manner, or a single value of the flag field that is different from the default value. For example, the format of the segment identifier of the network node does not describe the value of the flag field, or describes that the value of the flag field is the default value. In this case, the value of the flag field that is included in the segment identifier of the network node may be the default value or the specific value (for example, 1) other than the default value. Alternatively, the format of the segment identifier of the network node describes that the value of the flag field is the specific value other than the default value. In this case, the value of the flag field included in the segment identifier of the network node may be the default value or the specific value other than the default value.

In this case, the network node 101 may determine, according to the segment routing policy, the segment identifier SID of the network node that is included in the segment list of the packet. In this case, the flag value in the segment identifier SID of the network node is the specific value. Further, the network node 101 may further determine a flag value in the segment identifier of the network node in the segment list according to the segment routing policy, modify the flag value (the specific value) in the segment identifier SID of the network node based on the determined flag value, and add the determined flag value to the flag field in the segment identifier SID of the network node, to obtain a to-be-forwarded packet.

In an example, the network node 101 receives the format of the segment identifier of the network node, and the format of the segment identifier of the network node describes a plurality of values supported by the flag field in the segment identifier of the network node. Optionally, in this case, the segment identifier of the network node is not limited. For example, a value of a network slice included in the segment identifier of the network node that is advertised by the network node to the network node 101 may be the default value, or may not be the specific value (a single value) different from the default value. Alternatively, when the network node supports the plurality of values of the flag field, the network node may advertise a plurality of segment identifiers of the network node to the network node 101, where a segment identifier of each network node includes one value of the flag field, in other words, advertise the plurality of values of the flag field that are supported by the network node. In this case, the network node 101 may select, from the plurality of values (flag values) of the flag field of the network node according to the segment routing policy, a flag value that matches the segment routing policy, and add the selected flag value to the flag field in the segment identifier SID of the network node, in other words, add the selected flag value to the to-be-forwarded packet.

Figure 9A:
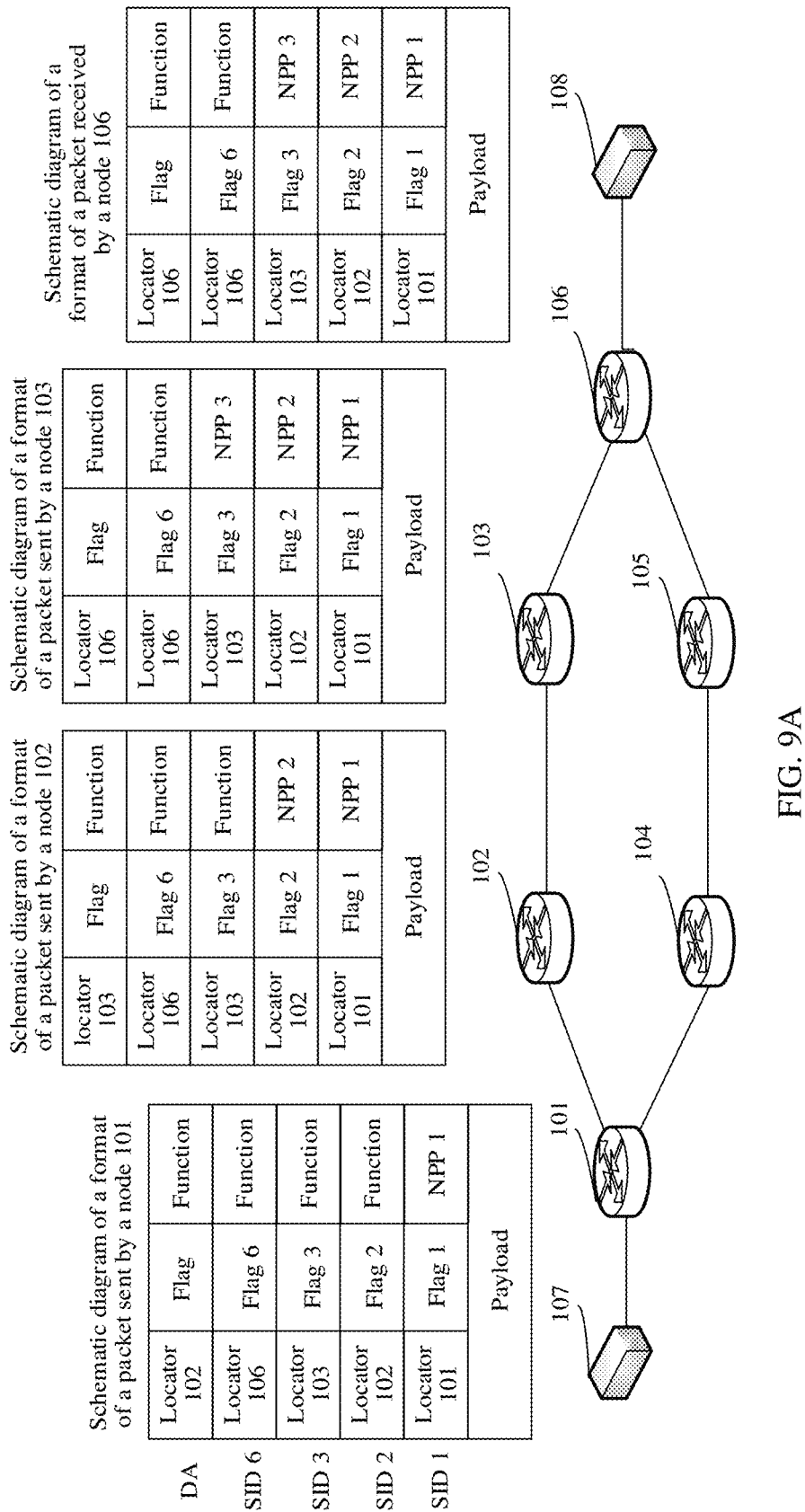
FIG. 9A to FIG. 9C are schematic diagrams of other three packet transmission scenarios according to an embodiment of the present invention.

In an example, the network node 101 receives a plurality of segment identifiers of the network node, and a segment identifier of each network node includes one value of the flag field. Optionally, in this case, the format of the segment identifier of the network node is not limited. For example, when the network node advertises the format of the segment identifier of the network node to the network node 101, the format may not describe the value of the flag field that is in the segment identifier of the network node, or may describe one or more values that are supported by the flag field and that are in the segment identifier of the network node, for example, the default value 0, or one or more values (for example, 1, 2) of the flag field that are different from the default value. In this case, the network node 101 may select, from a plurality of SIDs (in other words, flag values in the SIDs) of each network node according to the segment routing policy, a SID of a network node that is on the packet forwarding path and that matches the segment routing policy, construct the segment list of the packet based on the selected SID of the network node, and add the segment list to the packet to guide packet forwarding. In this example, the segment list may be <SID 6, SID 3, SID 2>. Alternatively, the segment list may further include the segment identifier of the network node 101, which may be specifically <SID 6, SID 3, SID 2, SID 1>. As shown in FIG. 9A, flag values in SIDs of each network node that are determined by the network node 101 according to the segment routing policy are respectively a flag 6, a flag 3, a flag 2, and a flag 1. Any two of the flag values may be the same or may be different. This is not limited in this embodiment of this application. In an actual application, in the same network performance measurement scenario, the flags 1 to 6 are generally the same. For example, when the flags are all 1, it indicates that the network performance parameter type is the time type, which is used to calculate a latency of packet transmission.

Correspondingly, after adding the determined flag value to the packet, the network node 101 may process the packet based on the segment list in the packet. Specifically, when the segment list included in the SRH is <SID 6, SID 3, SID 2, SID 1>, the network node 101 may obtain the flag 1 in the SID 1, and further obtain a network performance parameter of the network node 101 that corresponds to the network performance parameter type indicated by the flag 1. Further, the network node 101 obtains the SID 2 (a segment identifier of a next-hop node of the network node 101) from the segment list, and modifies the destination address of the packet to the SID 2. Optionally, the network performance parameter of the network node 101 may be further added to the packet. For example, the network performance parameter may be added to a function field of the SID 1 in the segment list of the packet, or may be added to another field of the packet, for example, a TLV field. As shown in FIG. 9A, for example, a network performance parameter NPP 1 of the network node 101 is stored in the function field of the SID 1.

Figure 9B:
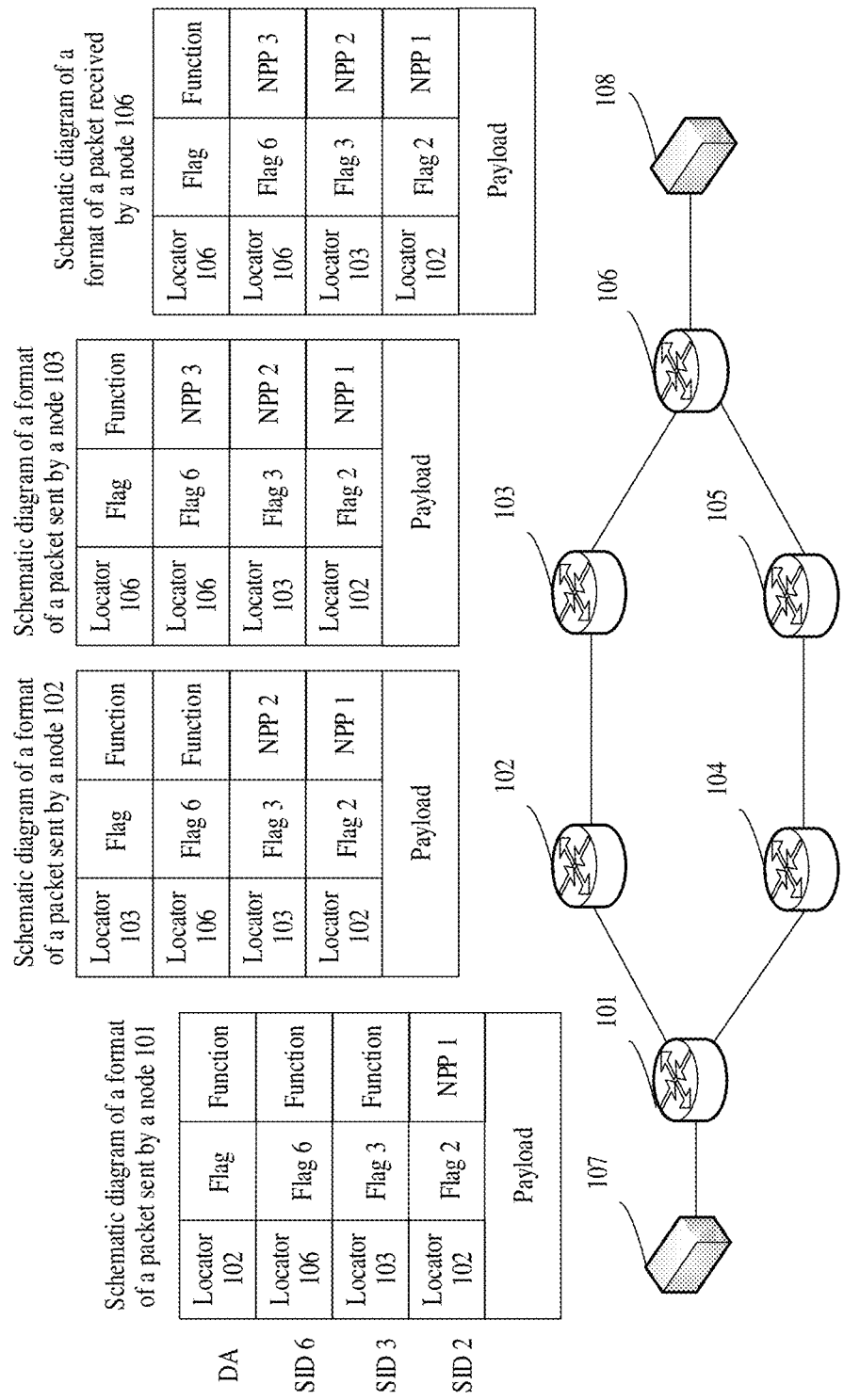

When the segment list included in the SRH is <SID 6, SID 3, SID 2>, the network node 101 may obtain a flag 2 in the SID 2, and further obtain a network performance parameter of the network node 101 that corresponds to a network performance parameter type indicated by the flag 2. Further, the network node 101 may modify the destination address of the packet to the SID 2, and add the network performance parameter of the network node 101 to the packet. For example, the network performance parameter may be added to a function field of the SID 2 in the segment list of the packet, or may be added to another field of the packet, for example, in the TLV field. As shown in FIG. 9B, for example, the network performance parameter NPP 1 of the network node 101 is stored in the function field of the SID 2.

S803: The network node 102 receives the packet, and when determining that the value of the destination address field of the packet matches the segment identifier of the network node 102, the network node 102 obtains the SID 3 from the segment list in the packet, and replaces the destination address of the packet with the SID 3. The network performance parameter of the network node 102 is added to the packet, and the packet to which the network performance parameter of the network node 102 is added is sent to a network node 103.

In an example, when the segment list included in the SRH is <SID 6, SID 3, SID 2, SID 1>, after receiving the packet, if determining that the value of the destination address field of the packet matches the segment identifier (SID 2) published by the network node 102, the network node 102 may parse the value flag 2 of the flag field in the SID 2, to determine the network performance parameter type indicated by the flag 2. Then, the network node 102 may obtain the network performance parameter of the corresponding network node 102 based on the network performance parameter type. Optionally, the network node 102 may further perform a corresponding operation based on an indication of another field in the SID 2, for example, perform a corresponding function operation based on the function field of the SID 2, for example, store a packet. This is not limited in this embodiment of this application. Further, the network node 102 may obtain the SID 3 from the segment list of the packet, modify the destination address of the packet to the SID 3, and add the network performance parameter NPP 2 of the network node 102 to the packet. Specifically, the network performance parameter NPP 2 of the network node 102 may be added to the SID 2 in the segment list, for example, added to the function field of the SID 2, or added to the another field of the packet, for example, the TLV field. As shown in FIG. 9A, the NPP 2 is added to the function field of the SID 2.

In an example, when the segment list included in the SRH is <SID 6, SID 3, SID 2>, similarly, after receiving the packet, if determining that the value of the destination address field of the packet matches the segment identifier (SID 2) published by the network node 102, the network node 102 can obtain the SID 3 from the segment list of the packet. Further, the network node 102 may obtain a network performance parameter type indicated by a flag 3 in the SID 3, and obtain the network performance parameter NPP 2 of the network node 102 based on the network performance parameter type. The NPP 2 is a network performance parameter corresponding to the network performance parameter type indicated by the flag 3 in the SID 3. Then, the network node 102 may modify the destination address of the packet to the SID 3, and add the network performance parameter NPP 2 of the network node 102 to the packet. Specifically, the network performance parameter NPP 2 may be added to the SID 3 in the segment list, for example, a function field of the SID 3, or another field, such as the TLV field, of the packet. As shown in FIG. 9B, the NPP 2 is added to the function field of the SID 3.

S804: The network node 103 receives the packet, and when determining that the value of the destination address field of the packet matches the segment identifier of the network node 103, the network node 103 obtains the SID 6 from the segment list in the packet, and replaces the destination address of the packet with the SID 6. A network performance parameter of the network node 103 is added to the packet, and the packet to which the network performance parameter of the network node 103 is added is sent to the network node 106.

In an example, when the segment list included in the SRH is <SID 6, SID 3, SID 2, SID 1>, the network node 103 may add the network performance parameter NPP 3 of the network node 103 to the packet, for example, add the network performance parameter NPP 3 to the SID 3 of the segment list of the packet, or add the network performance parameter NPP 3 to the another field (such as the TLV field) of the packet. The NPP 3 is a network performance parameter corresponding to the network performance parameter type indicated by the flag 3 in the SID 3. As shown in FIG. 9A, the NPP 3 is added to the function field of the SID 3.

In an example, when the segment list included in the SRH is <SID 6, SID 3, SID 2>, the network node 103 may add the network performance parameter NPP 3 of the network node 103 to the packet, for example, add the network performance parameter NPP 3 to the SID 6 of the segment list of the packet, or add the network performance parameter NPP 3 to the another field (such as the TLV field) of the packet. The NPP 3 is specifically a network performance parameter corresponding to the network performance parameter type indicated by the flag 6 in the SID 6. As shown in FIG. 9B, the NPP 3 is added to the function field of the SID 6. For content that is not shown or described in this example, refer to related descriptions in the S803. Details are not described herein again.

Figure 9C:
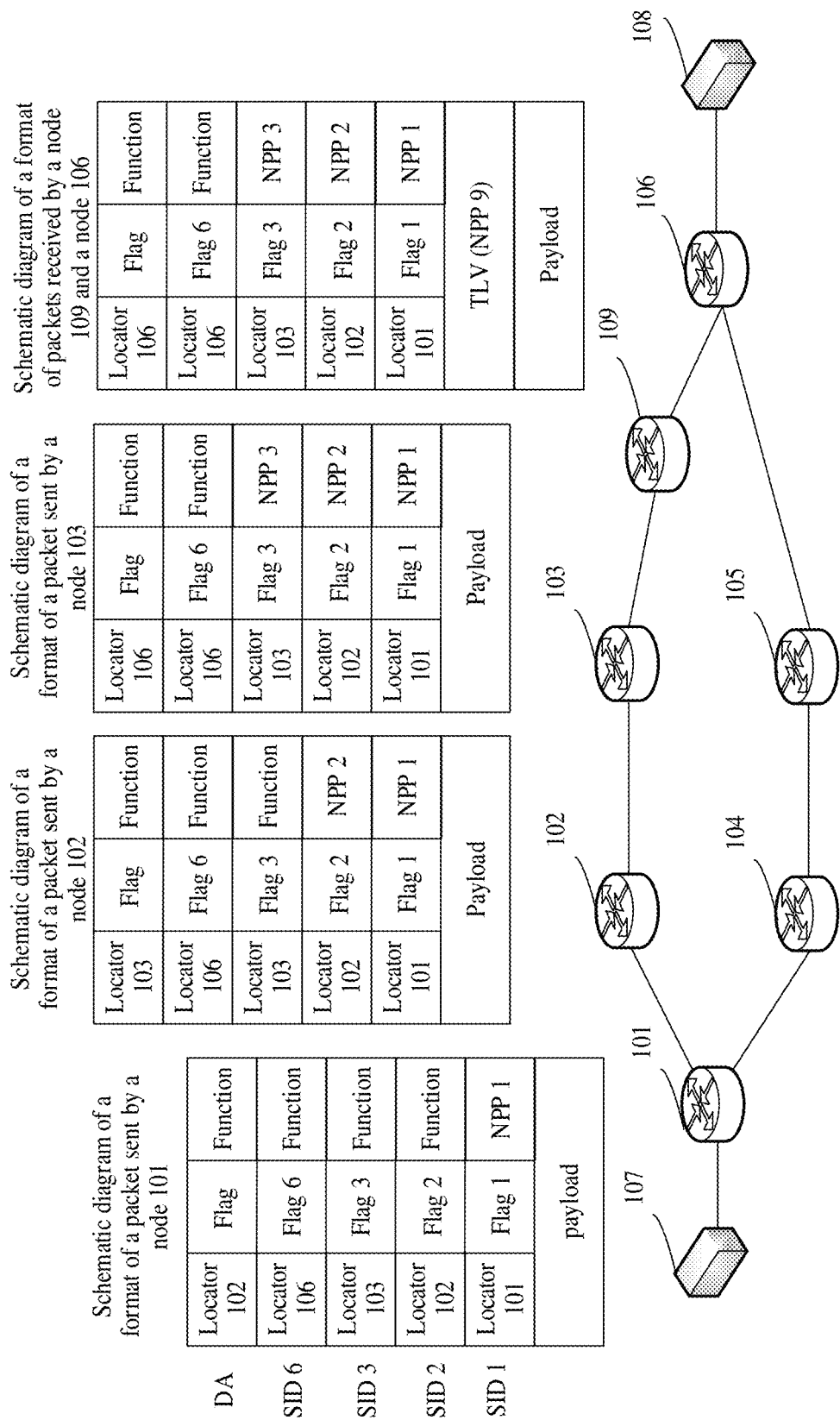

In specific implementation, in the network framework shown in FIG. 4B, a network node 109 that does not support the SRv6 function still exists between the network node 103 and the network node 106. In an actual communication process, after replacing the destination address of the packet with the SID 6, the network node 103 may add the network performance parameter of the network node 103 to the packet, and further send, to the network node 109, the packet to which the network performance parameter of the network node 103 is added. The network node 109 does not support the SRv6 function, in other words, the network node 109 does not have a segment identifier of the network node 109. After receiving the packet, the network node 109 may modify an existing node processing procedure based on an IPv6 network. After the network node 109 finds a next-hop node (namely, the network node 106) based on the destination address of the packet, the network node 109 may query the flag value carried in the packet (in actual service communication, because the flag 1 to the flag 6 are the same, the queried flag value herein may be specifically any one or more of the flag 1 to the flag 6), and add a network performance parameter NPP 9 of the network node 109 to the another field of the packet, for example, the TLV field. Specifically, as shown in FIG. 9C, the network performance parameter NPP 9 of the network node 109 is added to the TLV field of the packet. The network performance parameter of the network node 109 is a network performance parameter corresponding to the network performance parameter type indicated by the flag value.

Optionally, after receiving the packet sent by the network node 103, the network node 109 may obtain a network performance parameter of each network node by parsing the packet. Correspondingly, the network node 109 may perform corresponding network performance calculation based on the network performance parameter of each network node.

Step S805: The network node 106 receives the packet, and when determining that the value of the destination address field of the packet matches a segment identifier of the network node 106, calculates network performance based on the network performance parameter in the packet.

Specifically, when the segment list includes the segment identifier of the ingress node, for example, when the segment list is <SID 6, SID 3, SID 2, SID 1>, referring to FIG. 9A, the network performance parameter of each network node is stored in the segment identifier of the network node. For example, the network performance parameter NPP 1 of the network node 101 is stored in the SID 1 of the network node 101. When the segment list does not include the segment identifier of the ingress node, for example, when the segment list is <SID 6, SID 3, SID 2>, referring to FIG. 9B, the network performance parameter of each network node is stored in a segment identifier of a next-hop segment node corresponding to the network node. For example, the network performance parameter NPP 1 of the network node 101 is stored in the SID 2 of the network node 102. After the network node 106 receives the packet, because the network node 106 is a last segment node indicated by the segment list, a network performance parameter of the network node 106 does not need to be included in the segment list, and only the network performance needs to be calculated based on the network performance parameter of each network node in the segment list. Optionally, flag values in the SIDs in the segment list are the same. After receiving the packet, the network node 106 may calculate, based on a flag value in the destination address field of the packet, network performance for the network performance parameter type indicated by the flag value. For example, when the flag value in the destination address field of the packet is 1, in other words, when each SID in the segment list records a network performance parameter related to a packet sending time point, the network node 106 calculates network performance related to a packet forwarding latency.

By implementing the embodiments of this application, the prior-art problem that the programming capability of the network node is low because the format of the segment identifier of the network node cannot be explicitly advertised can be resolved. This improves the programming capability of the network node.

Figure 10:
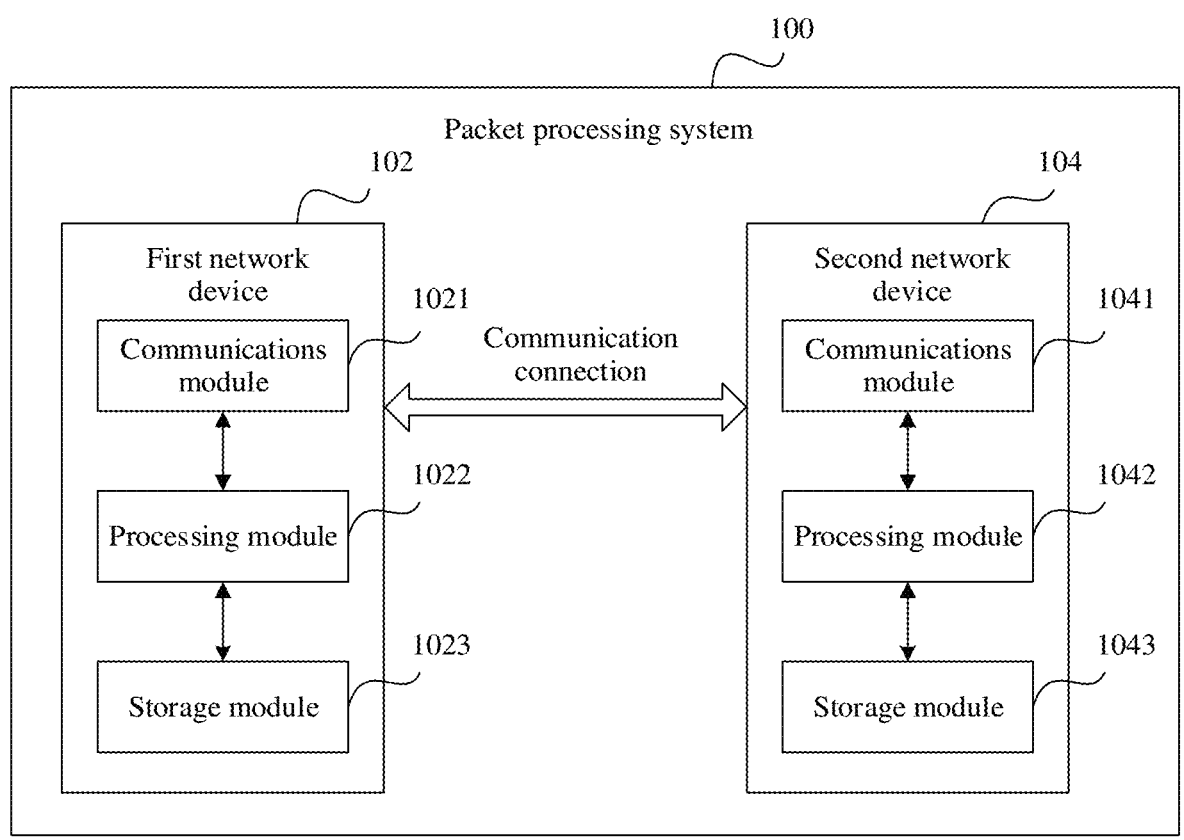
FIG. 10 and FIG. 11 are schematic structural diagrams of two packet processing systems according to an embodiment of the present invention.

With reference to the foregoing related embodiments shown in FIG. 1 to FIG. 9C, the following describes a related apparatus, device, and system in the embodiments of this application. FIG. 10 shows a packet processing system according to an embodiment of this application. The system 100 may include a first network device 102 and a second network device 104. The first network device 102 includes a communications module 1021 and a processing module 1022. The second network device 104 includes a communications module 1041 and a processing module 1042.

The processing module 1022 is configured to control and manage an action of the first network device 102. For example, the processing module 1022 may be configured to perform the step S502 in FIG. 5, the step S600, the step S601, and the step S602 in FIG. 6A, the step S800, the step S801, and the step S802 in FIG. 8A, and/or another step used to perform the technology described in this specification. The communications module 1021 is configured to support the first network device 102 in communicating with another device or module. For example, the communications module 1021 is configured to support the first network device 102 in performing the step S503 in FIG. 5, and/or is configured to perform the another step used to perform the technology described in this specification.

The processing module 1042 is configured to control and manage an action of the second network device 104. For example, the processing module 1042 may be configured to perform the step S504 in FIG. 5, any step in the steps S603 to S605 in FIG. 6A and FIG. 6B, any step in the steps S803 to S805 in FIG. 8B, and/or the another step used to perform the technology described in this specification. The communications module 1041 is configured to support the second network device 104 in communicating with another device or module. For example, the communications module 102 is configured to support the second network device 104 in performing the steps S500 and S501 in FIG. 5, and/or is configured to perform the another step used to perform the technology described in this specification.

Optionally, the first network device 102 may further include a storage module 1023. The storage module 1023 is configured to store program code and data of the first network device 102. Correspondingly, the processing module 1022 may invoke the program code in the storage module 1023 to implement some or all of the implementation steps that are described in any one of the method embodiments in FIG. 5, FIG. 6A and FIG. 6B, or FIG. 8A and FIG. 8B and that are performed by the first network node. The second network device 104 may further include a storage module 1043. The storage module 1043 is configured to store program code and data of the second network device 104. Correspondingly, the processing module 1042 may invoke the program code in the storage module 1043 to implement some or all of the implementation steps that are described in any one of the method embodiments in FIG. 5, FIG. 6A and FIG. 6B, or FIG. 8A and FIG. 8B and that are performed by the second network node (or any network node other than the first network node).

The processing module (which may be specifically the processing module 1022 or 1042) may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. Communications module (which may be specifically the communications module 1021 or 1041) may be a communications interface, a transceiver, a transceiver circuit, or the like. The communications interface is a general term, and may include one or more interfaces, for example, an interface between the communications module and a processing module, or an interface between a computing device and another device. The storage module (which may be specifically the storage module 1023 or 1043) may be a memory, or another service or module configured to provide a storage function.

Figure 11:
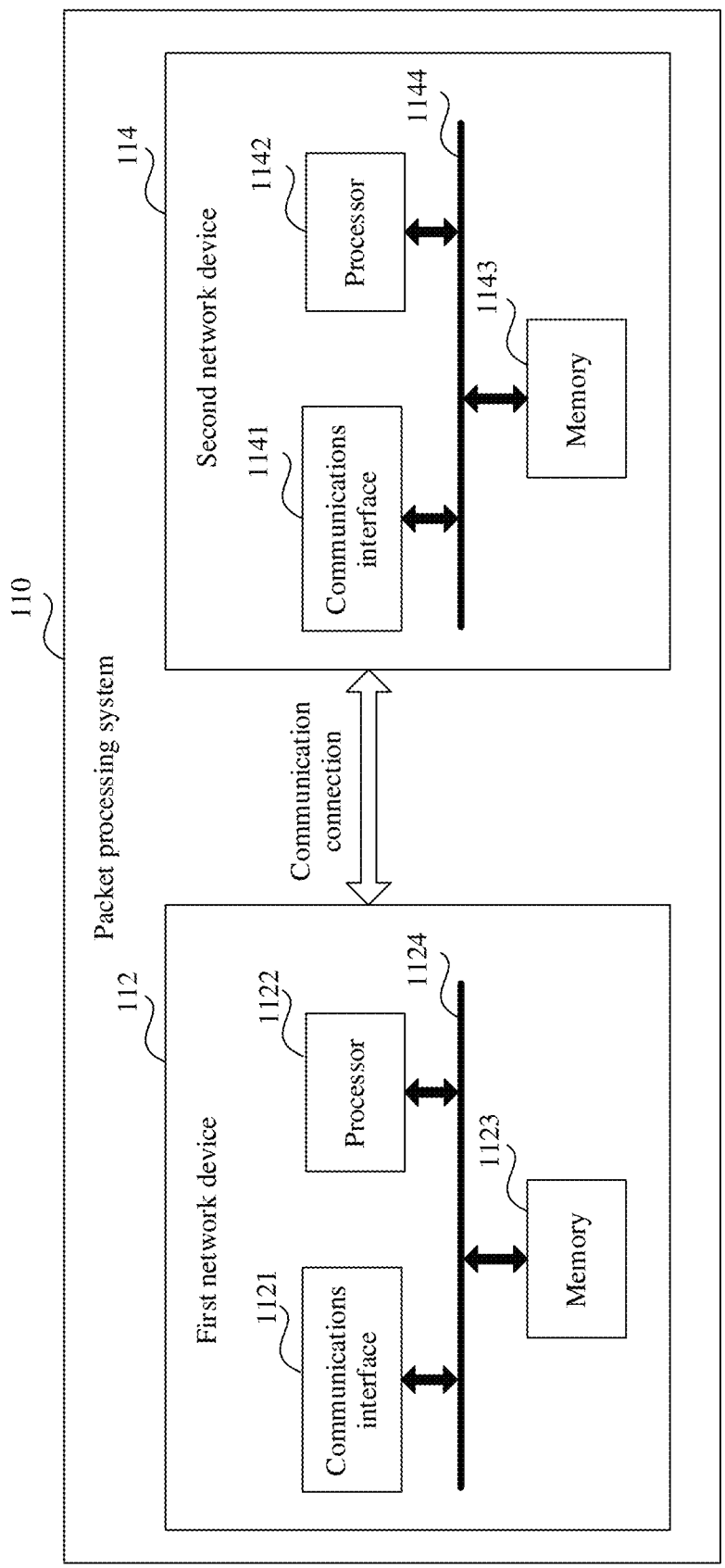

When the processing module is the processor, the communications module is the communications interface, and the storage module is the memory, the packet processing system in this embodiment of this application may be a packet processing system shown in FIG. 11.

Referring to FIG. 11, the packet processing system no includes a first network device 112 and a second network device 114. The first network device 112 includes a communications interface 1121, a processor 1122, and a memory 1123. Optionally, the first network device 112 may further include a bus 1124. The communications interface 1121, the processor 1122, and the memory 1123 may be connected to each other by using the bus 1124. The bus 1124 may be a peripheral component interconnect (PCI for short) bus, an extended industry standard architecture (EISA for short) bus, or the like. The bus 1124 may be classified into an address bus, a data bus, a control bus, and the like. For ease of representation, only one thick line is used to represent the bus in FIG. 11, but this does not mean that there is only one bus or only one type of bus.

Similarly, the second network device 114 includes a communications interface 1141, a processor 1142, and a memory 1143. Optionally, the second network device 114 may further include a bus 1144. The communications interface 1141, the processor 1142, and the memory 1143 may be connected to each other by using the bus 1144. For the bus 1144, refer to the foregoing related descriptions.

The processor (which may be specifically the processor 1122 or 1142) may include one or more general-purpose processors, for example, a central processing unit (CPU). The processor may be configured to run a program of a processing function in related program code. In other words, the processor may implement a function of the processing module by executing the program code. For details about the processing module, refer to related descriptions in the foregoing embodiment. Specifically, the processor 1122 may be configured to run related program code in the memory 1123 to implement a function of the processing module 1022, or implement the step S502 in FIG. 5, the step S601 and the step S602 in FIG. 6A, and the step S801 and the step S802 in FIG. 8A, and/or is configured to perform other steps of the technology described in this specification.

The processor 1142 may be configured to run related program code in the memory 1143 to implement a function of the processing module 1042, or implement the step S504 in FIG. 5, any step in the steps S603 to S605 in FIG. 6A and FIG. 6B, or any step in the steps S803 to S805 in FIG. 8B, and/or is configured to perform other steps of the technology described in this specification.

The communications interface (which may be specifically the communications interface 1121 or 1141) may be a wired interface (for example, an Ethernet interface) or a wireless interface (for example, a cellular network interface or a wireless local area network interface), and is configured to communicate with another module or device. For example, the communications interface 1121 in this embodiment of this application may be specifically configured to: receive a packet sent by the second network device, or send a packet to the second network device.

The memory (which may be specifically the memory 1123 or 1143) may include a volatile memory (Volatile Memory), for example, a random access memory (RAM). The memory may also include a non-volatile memory, for example, a read-only memory (ROM), a flash memory, a hard disk drive (HDD), or a solid-state drive (SSD). The memory 1003 may further include a combination of the foregoing types of memories. The memory may be configured to store a group of program code, so that the processor invokes the program code stored in the memory to implement functions of the communications module and/or the processing module in the embodiments of this application. This is not limited in the embodiments of this application.

It should be noted that FIG. 10 or FIG. 11 is merely a possible implementation of this embodiment of this application. In an actual application, the packet processing system may further include more or fewer components. This is not limited herein. For content that is not shown or not described in this embodiment of this application, refer to related descriptions in the embodiment in FIG. 5, FIG. 6A and FIG. 6B, or FIG. 8A and FIG. 8B. Details are not described herein again.

An embodiment of the present invention further provides a computer non-transient storage medium. The computer non-transient storage medium stores an instruction, and when the instruction is run on a processor, any method procedure described in FIG. 5, FIG. 6A and FIG. 6B, or FIG. 8A and FIG. 8B is implemented.

An embodiment of the present invention further provides a computer program product. When the computer program product runs on a processor, any method procedure described in FIG. 5, FIG. 6A and FIG. 6B, or FIG. 8A and FIG. 8B is implemented.

Methods or algorithm steps described in combination with the content disclosed in this embodiment of the present invention may be implemented by hardware, or may be implemented by a processor by executing a software instruction. The software instruction may include a corresponding software module. The software module may be stored in a random access memory (RAM for short), a flash memory, a read-only memory (ROM), an erasable programmable read-only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located on a computing device. Certainly, the processor and the storage medium may exist in the computing device as discrete components.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

What is claimed is:

1. A network device, wherein the network device is a first network node, the network device comprising:
   at least one processor; and
   a non-transitory computer-readable storage medium storing a program to be executed by the at least one processor, the program including instructions for:
      receiving a first packet sent by a second network node, wherein the first packet comprises a format of a segment identifier of the second network node, and wherein the format of the segment identifier of the second network node describes a length and a location of each field in the segment identifier of the second network node;
      obtaining the format of the segment identifier of the second network node based on the first packet, wherein the segment identifier of the second network node comprises a first field; and
      including a determined value of the first field in the segment identifier of the second network node in a second packet sent to the second network node, wherein the value of the first field in the segment identifier of the second network node is determined based on a segment routing policy and the format of the segment identifier of the second network node, and wherein the determined value of the first field indicates to the second network node to process the second packet.

2. The network device according to claim 1, wherein the determined value of the first field in the segment identifier is at least one of:
   the value of the first field that is modified according to the segment routing policy, wherein the value of the first field in the segment identifier of the second network node is a predetermined value; or
   a value that is from a plurality of values comprised in the first field, that is selected according to the segment routing policy, and that matches the segment routing policy, wherein the segment identifier of the second network node comprises the value of the first field.

3. The network device according to claim 1, wherein the first field is a flag field, wherein the determined value of the first field is a determined value of the flag field, wherein the determined value of the flag field indicates a network performance parameter type, and wherein the determined value of the flag field further indicates to the second network node to add, to the second packet, a network performance parameter corresponding to the network performance parameter type.

4. The network device of claim 3, wherein the determined value of the flag field indicates to the second network node to add, when the second network node supports an internet protocol version 6 (IPv6), the network performance parameter corresponding to the network performance parameter type to a field, other than the segment identifier of the second network node, in the second packet.

5. The network device of claim 3, wherein the determined value of the flag field indicates to the second network node to add, when the second network node supports segment routing over internet protocol version 6 (SRv6), the network performance parameter corresponding to the network performance parameter type to the segment identifier of the second network node in the second packet.

6. The network device according to claim 5, wherein the network performance parameter comprises information associated with at least one of:
   a time point at which the second network node sends the second packet;
   a quantity of service packets received by the second network node before sending the second packet, wherein one or more service packets associated with the quantity of service packets and the second packet belong to a same data flow;
   a queue length of a packet sending queue of the second network node, wherein the packet sending queue is a queue in which the second packet is disposed; or
   a communications interface used by the second network node to transmit the second packet.

7. The network device according to claim 1, wherein the first field is a network slice field, wherein the determined value of the first field is a determined value of the network slice field, wherein the determined value of the network slice field indicates a network slice identifier, wherein the determined value of the network slice field further indicates to the second network node to process the second packet based on the network slice identifier, and wherein the network slice identifier identifies a network slice used when the second packet is transmitted.

8. The network device according to claim 1, wherein the segment identifier of the second network node comprises a plurality of first fields, wherein a first selected first field in the plurality of first fields is a flag field, and wherein a second selected first field in the plurality of first fields, other than the first selected first field, is a network slice field;
   wherein the determined value of the flag field indicates a network performance parameter type, and wherein the determined value of the flag field further indicates to the second network node to add a network performance parameter corresponding to the network performance parameter type to the second packet; and wherein the determined value of the network slice field indicates a network slice identifier, wherein the determined value of the network slice field further indicates to the second network node to process the second packet based on the network slice identifier, and wherein the network slice identifier identifies a network slice used when the second packet is transmitted.

9. A network device, wherein the network device is a second network node, the network device comprising:
   at least one processor; and
   a non-transitory computer-readable storage medium storing a program to be executed by the at least one processor, the program including instructions for:
      determining a format of a segment identifier of the second network node, wherein the format of the segment identifier of the second network node describes a length and a location of each field in the segment identifier of the second network node, and wherein the segment identifier of the second network node comprises a first field; and
      sending a first packet to a first network node, wherein the first packet comprises the format of the segment identifier of the second network node, and wherein the format of the segment identifier is used by the first network node to determine a value of the first field in the segment identifier of the second network node according to a segment routing policy.

10. The network device according to claim 9, wherein at least one of:
   a value of the first field in the segment identifier of the second network node is a specific value, and wherein the determined value of the first field is associated with the value of the first field in the format of the segment identifier of the second network node that is modified according to the segment routing policy; or
   the format of the segment identifier of the second network node comprises the value of the first field, wherein the first field has a plurality of values, and wherein the determined value of the first field is a value that matches the segment routing policy, that is in the plurality of values of the first field, and that is associated with the segment routing policy.

11. The network device according to claim 9, wherein the first field comprises a flag field, wherein the determined value of the first field is a value of the flag field, wherein the value of the flag field indicates a network performance parameter type, and wherein the value of the flag field further indicates to the second network node to add a network performance parameter corresponding to the network performance parameter type to a second packet.

12. The network device according to claim 9, wherein the first field comprises a network slice field, wherein the determined value of the first field is a value of the network slice field, wherein the value of the network slice field indicates a network slice identifier, wherein the determined value of the network slice field further indicates to the second network node to process a second packet based on the network slice identifier, and wherein the network slice identifier identifies a network slice used when the second packet is transmitted.

13. The network device according to claim 9, wherein there are a plurality of first fields, wherein a first selected first field in the plurality of first fields is a flag field, and wherein a second selected first field of the plurality of first fields, other than the first selected first field, is a network slice field;

wherein a value of the flag field indicates a network performance parameter type, and wherein the value of the flag field further indicates to the second network node to add a network performance parameter corresponding to the network performance parameter type to a second packet; and
wherein a value of the network slice field indicates a network slice identifier, wherein the value of the network slice field further indicates to the second network node to process the second packet based on the network slice identifier, and wherein the network slice identifier is identifies a network slice used when the second packet is transmitted.

14. A network device, wherein the network device is a second network node for a packet processing system having a first network node and the second network node, the network device comprising:
   at least one processor; and
   a non-transitory computer-readable storage medium storing a program to be executed by the at least one processor, the program including instructions for:
      sending a first packet to the first network node, wherein the first packet comprises a format of a segment identifier of the second network node, wherein the format of the segment identifier of the second network node describes a length and a location of each field in the segment identifier of the second network node, and wherein the segment identifier of the second network node comprises a network slice field;
      receiving a second packet sent by the first network node, wherein the second packet comprises the segment identifier of the second network node, wherein the segment identifier of the second network node comprises a value of the network slice field, and wherein the value of the network slice field is determined according to a segment routing policy; and
      processing the second packet based on the value of the network slice field.

15. The network device according to claim 14, wherein the instructions for processing the second packet include instructions for:
   processing the second packet based on a network slice identifier indicated by the value of the network slice field.

16. The network device according to claim 14, wherein the value of the network slice field indicates a network slice identifier, wherein the determined value of the network slice field further indicates to the second network node to process a second packet based on the network slice identifier, and wherein the network slice identifier identifies a network slice used when the second packet is transmitted.

17. A network device, wherein the network device is a second network node for a packet processing system having a first network node and the second network node, the network device comprising:
   at least one processor; and
   a non-transitory computer-readable storage medium storing a program to be executed by the at least one processor, the program including instructions for:
      sending a first packet to the first network node, wherein the first packet comprises a format of a segment identifier of the second network node, wherein the format of the segment identifier of the second network node describes a length and a location of each field in the segment identifier of the second network node, and wherein the segment identifier of the second network node comprises a flag field;

receiving a second packet sent by the first network node, wherein the second packet comprises a value of the flag field, wherein the value of the flag field is associated with a segment routing policy, and wherein the value of the flag field indicates a network performance parameter type; and adding information associated with a network performance parameter of the second network node to the second packet, wherein the network performance parameter is a network performance parameter corresponding to the network performance parameter type.

18. The network device according to claim 17, wherein the instructions for adding the information associated with the network performance parameter of the second network node to the second packet include instructions for:

adding, when the second network node supports segment routing over internet protocol version 6 (SRv6), the network performance parameter of the second network node to the segment identifier of the second network node in the second packet.

19. The network device according to claim 17, wherein the instructions for adding the network performance parameter of the second network node to the second packet include instructions for:

adding, when the second network node supports an internet protocol version 6 (IPv6), the network performance parameter of the second network node to a byte, other than the segment identifier of the second network node, in the second packet.

20. The network device according to claim 17, wherein the network performance parameter comprises information indicating at least one of:

a time point at which the second network node sends the second packet;

a quantity of service packets received by the second network node before sending the second packet, wherein one or more service packets associated with the quantity of service packets and the second packet belong to a same data flow;

a queue length of a packet sending queue of the second network node, wherein the packet sending queue is a queue in which the second packet is disposed; or a communications interface used by the second network node to transmit the second packet.

* * * * *